US011529973B1

(12) United States Patent
Dittmer et al.

(10) Patent No.: US 11,529,973 B1
(45) Date of Patent: Dec. 20, 2022

(54) SOFTWARE APPLICATION FOR SENSOR ANALYSIS

(71) Applicant: Waymo LLC, Mountain View, CA (US)

(72) Inventors: Jeremy Dittmer, Mountain View, CA (US); Ruffin Evans, Mountain View, CA (US); Vaibhav Nangia, Pleasanton, CA (US); Benjamin Ingram, Santa Clara, CA (US); Erik Chubb, Alameda, CA (US); Yonatan Winetraub, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 225 days.

(21) Appl. No.: 17/093,274

(22) Filed: Nov. 9, 2020

(51) Int. Cl.
| | | |
|---|---|---|
| B60W 60/00 | (2020.01) | |
| G01S 13/89 | (2006.01) | |
| G01S 17/89 | (2020.01) | |
| G01S 17/58 | (2006.01) | |
| G05D 1/02 | (2020.01) | |
| G01S 13/58 | (2006.01) | |
| G06V 10/22 | (2022.01) | |
| G06V 20/58 | (2022.01) | |

(Continued)

(52) U.S. Cl.
CPC ......... B60W 60/0025 (2020.02); G01S 13/58 (2013.01); G01S 13/89 (2013.01); G01S 17/58 (2013.01); G01S 17/89 (2013.01); G05D 1/0212 (2013.01); G06V 10/22 (2022.01); G06V 20/58 (2022.01); G06V 20/588 (2022.01); G01S 13/931 (2013.01); G01S 17/931 (2020.01); G05D 1/0088 (2013.01); G05D 2201/0213 (2013.01)

(58) Field of Classification Search
CPC .... B60W 60/0025; G01S 17/89; G06V 10/22; G06V 20/588
See application file for complete search history.

(56) References Cited

U.S. PATENT DOCUMENTS

| | | |
|---|---|---|
| 8,649,932 B2 | 2/2014 | Mian et al. |
| 8,781,669 B1 | 7/2014 | Teller et al. |

(Continued)

OTHER PUBLICATIONS

Fraade-Blanar et al., "Measuring Automated Vehicle Safety: Forging a Framework," The RAND Corporation, 2018, 91 pages.

*Primary Examiner* — Tan Q Nguyen
(74) *Attorney, Agent, or Firm* — McDonnell Boehnen Hulbert & Berghoff LLP

(57) ABSTRACT

A method includes determining a target specification map that is associated with a task and that indicates, for each respective region of a plurality of regions around a vehicle equipped with a sensor, a target value of a parameter of the sensor. The method also includes determining a capability specification map that indicates, for each respective region, an attained value of the parameter that the sensor is configured to provide. The method additionally includes comparing the capability specification map to the target specification map to determine, for each respective region, a disparity between the target value and the attained value. The method further includes, based on the comparing, identifying one or more of: a first subset of the plurality of regions where the target value exceeds the attained value or a second subset of the plurality of regions where the attained value meets or exceeds the target value.

20 Claims, 15 Drawing Sheets

(51) Int. Cl.
    *G06V 20/56*     (2022.01)
    *G05D 1/00*     (2006.01)
    *G01S 17/931*     (2020.01)
    *G01S 13/931*     (2020.01)

(56) References Cited

U.S. PATENT DOCUMENTS

| | | |
|---|---|---|
| 8,874,372 B1 | 10/2014 | Zhu et al. |
| 8,989,945 B2 | 3/2015 | Callow |
| 9,176,500 B1 | 11/2015 | Teller et al. |
| 9,499,175 B2 | 11/2016 | Tuukkanen |
| 9,555,740 B1 | 1/2017 | Zhu et al. |
| 9,558,157 B2 | 1/2017 | Steinhardt et al. |
| 9,650,051 B2 | 5/2017 | Hoye et al. |
| 9,651,390 B1 * | 5/2017 | Thompson .............. F21S 41/60 |
| 9,679,191 B1 | 6/2017 | Zhu et al. |
| 10,452,067 B2 | 10/2019 | Adam et al. |
| 2009/0306880 A1 | 12/2009 | Gomi et al. |
| 2016/0210775 A1 | 7/2016 | Alaniz et al. |
| 2019/0278290 A1 | 9/2019 | Zhang et al. |
| 2020/0355820 A1 * | 11/2020 | Zeng ....................... G06K 9/629 |
| 2021/0156963 A1 * | 5/2021 | Popov ....................... G06N 3/08 |
| 2022/0030430 A1 * | 1/2022 | Lund ....................... H04W 8/24 |

\* cited by examiner

| TASK CATEGORY | ROAD CONFIGURATION | | ROAD USERS | | VEHICLES | | TRAFFIC LIGHTS | | SIGNS | | ... | FOREIGN OBJECT | |
|---|---|---|---|---|---|---|---|---|---|---|---|---|---|
| SPEED (MPH) | NUMBER OF LANES | MAX. GRADE (%) | TASK 702 | TASK 704 | TASK 706 | TASK 708 | TASK 710 | TASK 712 | TASK 714 | TASK 716 | ... | TASK 718 | TASK 720 |
| 0 | N/A | N/A | N/A | N/A | N/A | N/A | N/A | N/A | N/A | N/A | | N/A | N/A |
| 10 | 1 | 18 | 0.3 | 3.0 | 1.5 | 0.6 | 1.8 | 1.4 | 3.0 | 2.0 | | 0.7 | 1.2 |
| 10 | 1 | 23 | 0.3 | N/A | 0.9 | 0.5 | 1.8 | 1.4 | 3.0 | 2.0 | | 0.5 | 0.9 |
| 15 | 1 | 17 | 1.5 | N/A | 1.7 | 2.0 | 1.6 | 1.3 | 2.6 | 1.7 | | 1.0 | 2.9 |
| 20 | 1 | 16 | 1.2 | N/A | 1.3 | 1.5 | 1.4 | 1.2 | 2.1 | 1.4 | | 0.7 | 2.0 |
| 25 | 2 | 15 | 1.0 | N/A | 1.1 | 3.8 | 1.2 | 1.1 | 1.7 | 1.2 | | 0.6 | 1.5 |
| ... | ... | ... | ... | ... | ... | ... | ... | ... | ... | ... | | ... | ... |
| 70 | 5 | 6 | N/A | N/A | 1.3 | 1.0 | N/A | N/A | N/A | N/A | | 0.7 | 1.0 |
| 75 | 3 | 5 | N/A | N/A | 1.2 | 0.9 | N/A | N/A | N/A | N/A | | 0.7 | 0.8 |
| BRAKING DECELERATION (M/S²) | | | -5.5 | N/A | 5 | -5.5 | -2.1 | -4 | -4 | -4 | | N/A | -2.1 |
| LANE CHANGE TIME (S) | | | N/A | N/A | N/A | N/A | N/A | N/A | N/A | N/A | | 5 | N/A |
| MAX/MIN. PARAMETER VALUE | | | 0.013 | 0.013 | 0.024 | 0.014 | 0.041 | 0.031 | 0.027 | 0.018 | | 0.014 | 0.026 |

SOFTWARE APPLICATION FOR SENSOR ANALYSIS

BACKGROUND

A vehicle may include thereon one or more sensors. The vehicle may be configured to perform various tasks in an environment based on sensor data received from the one or more sensors. The one or more sensors may be repositionable with respect to the vehicle to vary the portion of the environment observed by the one or more sensors.

SUMMARY

A software application may be configured to determine a task-specific target specification map that indicates, for each respective region of a plurality of regions around a vehicle, whether the respective region is to be scanned in connection with performance of the task and, if so, the sensor parameter values with which the respective region is to be scanned. The target specification map may thus include a set of spatially-varying sensor parameter values that are sufficient and/or optimal for performing a corresponding task. The software application may also be configured to determine a capability specification map that indicates, for each respective region, whether the respective region is observable by one or more sensors on the vehicle and, if so, the sensor parameter values that the sensor is configured to provide in the respective region. The capability specification map may thus indicate a set of spatially-varying sensor parameter values that one or more sensors on the vehicle are capable of providing. Further, the software application may be configured to compare the target specification map to the capability specification map to identify regions where the one or more sensors are capable of providing sufficient and/or optimal sensor data, and/or regions where the one or more sensors are not capable of providing sufficient and/or optimal sensor data. Based on these regions, aspects of the one or more sensors may be modified so as to provide sufficient and/or optimal sensor data for the corresponding task.

In a first example embodiment, a method is provided that may include determining a target specification map associated with a corresponding task. The target specification map may indicate, for each respective region of a plurality of regions around a vehicle equipped with a sensor, a target value of a parameter of the sensor. The method may also include determining a capability specification map that indicates, for each respective region of the plurality of regions, an attained value of the parameter that the sensor is configured to provide. The method may further include comparing the capability specification map to the target specification map to determine, for each respective region of the plurality of regions, a disparity between the target value and the attained value. The method may further include, based on comparing the capability specification map to the target specification map, identifying one or more of: (i) a first subset of the plurality of regions where the target value exceeds the attained value or (ii) a second subset of the plurality of regions where the attained value meets or exceeds the target value.

In a second example embodiment, a non-transitory computer-readable storage medium is provided having stored thereon instructions that, when executed by a computing system, cause the computing system to perform operations. The operations may include determining a target specification map associated with a corresponding task. The target specification map may indicate, for each respective region of a plurality of regions around a vehicle equipped with a sensor, a target value of a parameter of the sensor. The operations may also include determining a capability specification map that indicates, for each respective region of the plurality of regions, an attained value of the parameter that the sensor is configured to provide. The operations may additionally include comparing the capability specification map to the target specification map to determine, for each respective region of the plurality of regions, a disparity between the target value and the attained value. The operations may further include, based on comparing the capability specification map to the target specification map, identifying one or more of: (i) a first subset of the plurality of regions where the target value exceeds the attained value or (ii) a second subset of the plurality of regions where the attained value meets or exceeds the target value.

In a third example embodiment, a system is provided that includes a processor, and a non-transitory computer-readable storage medium having stored thereon instructions that, when executed by the processor, cause the processor to perform operations. The operations may include determining a target specification map associated with a corresponding task. The target specification map may indicate, for each respective region of a plurality of regions around a vehicle equipped with a sensor, a target value of a parameter of the sensor. The operations may also include determining a capability specification map that indicates, for each respective region of the plurality of regions, an attained value of the parameter that the sensor is configured to provide. The operations may additionally include comparing the capability specification map to the target specification map to determine, for each respective region of the plurality of regions, a disparity between the target value and the attained value. The operations may further include, based on comparing the capability specification map to the target specification map, identifying one or more of: (i) a first subset of the plurality of regions where the target value exceeds the attained value or (ii) a second subset of the plurality of regions where the attained value meets or exceeds the target value.

In a fourth example embodiment, a system is provided that may include means for determining a target specification map associated with a corresponding task. The target specification map may indicate, for each respective region of a plurality of regions around a vehicle equipped with a sensor, a target value of a parameter of the sensor. The system may also include means for determining a capability specification map that indicates, for each respective region of the plurality of regions, an attained value of the parameter that the sensor is configured to provide. The system may additionally include means for comparing the capability specification map to the target specification map to determine, for each respective region of the plurality of regions, a disparity between the target value and the attained value. The system may further include means for, based on comparing the capability specification map to the target specification map, identifying one or more of: (i) a first subset of the plurality of regions where the target value exceeds the attained value or (ii) a second subset of the plurality of regions where the attained value meets or exceeds the target value.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 illustrates a chart of results of task-specific analyses, in accordance with example embodiments.

DETAILED DESCRIPTION

Figure 1:
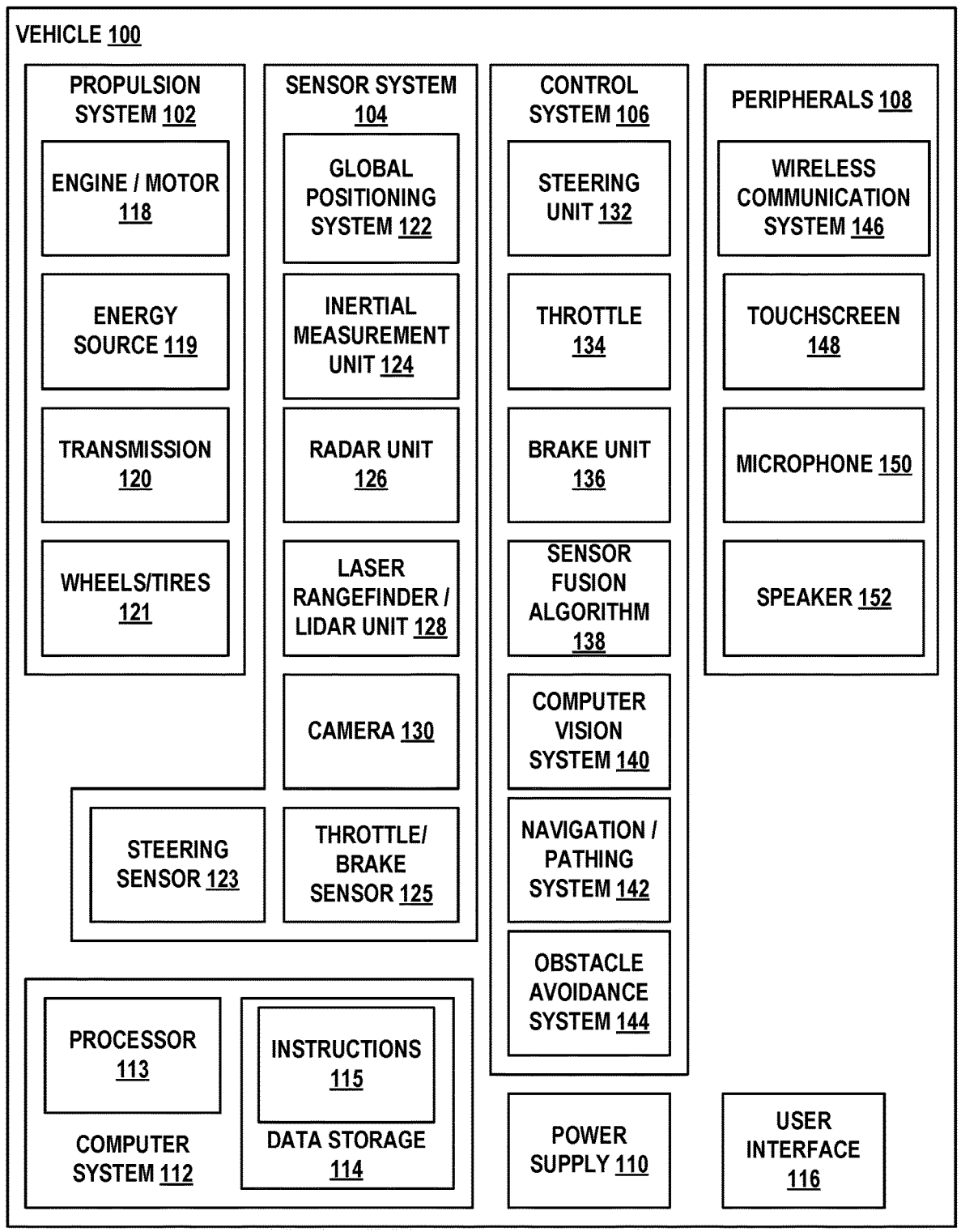
FIG. 1 illustrates a vehicle system, in accordance with example embodiments.
Figure 2A:
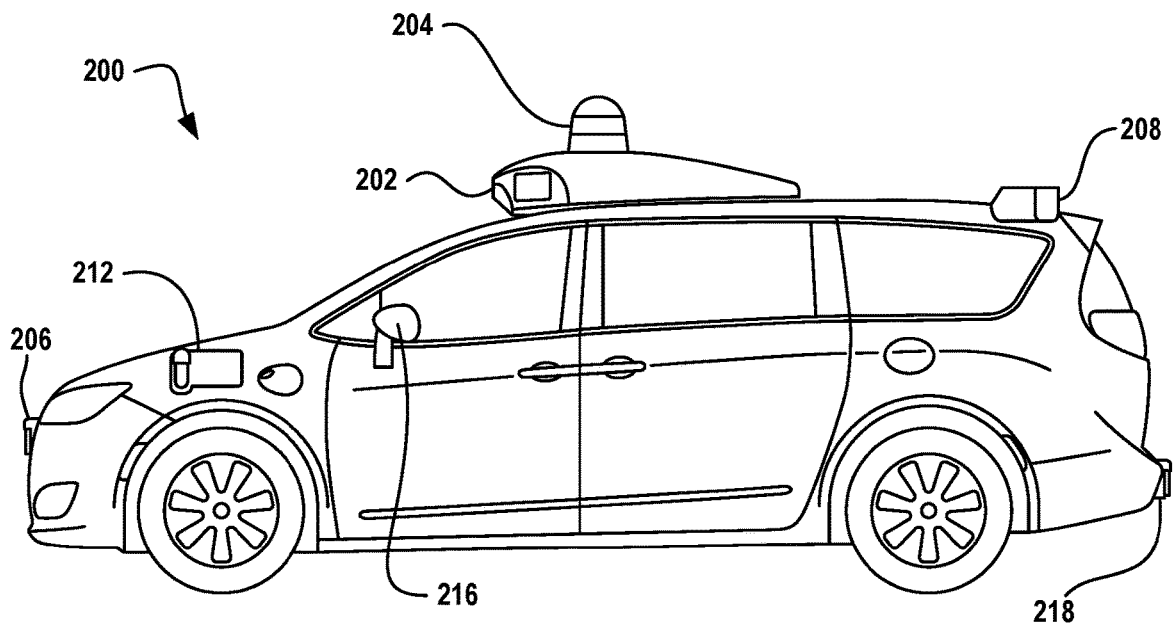
FIGS. 2A, 2B, 2C, 2D, and 2E illustrate a physical configuration of a vehicle, in accordance with example embodiments.
Figure 2B:
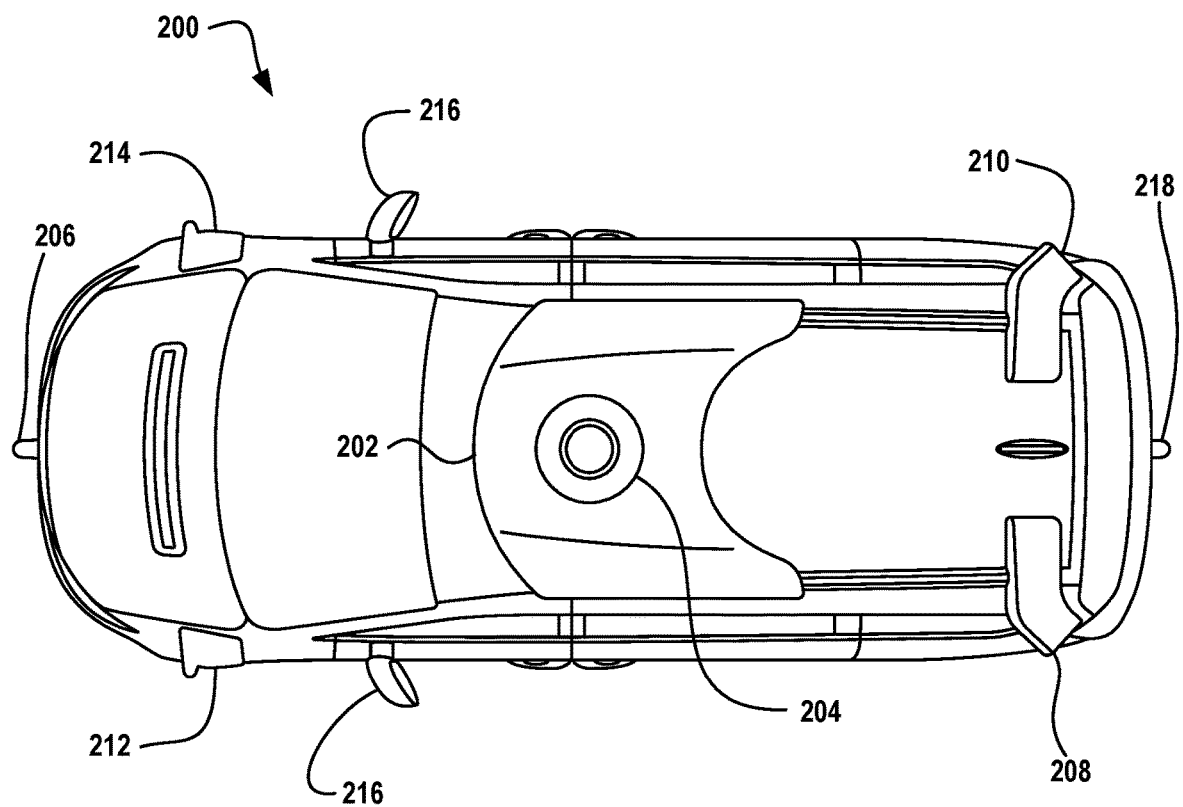
Figure 2C:
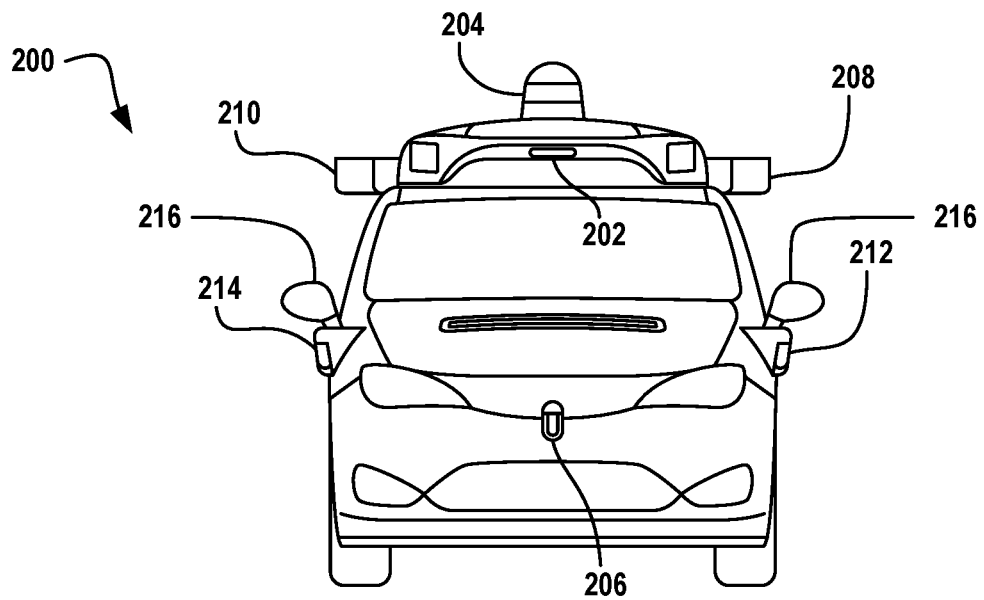
Figure 2D:
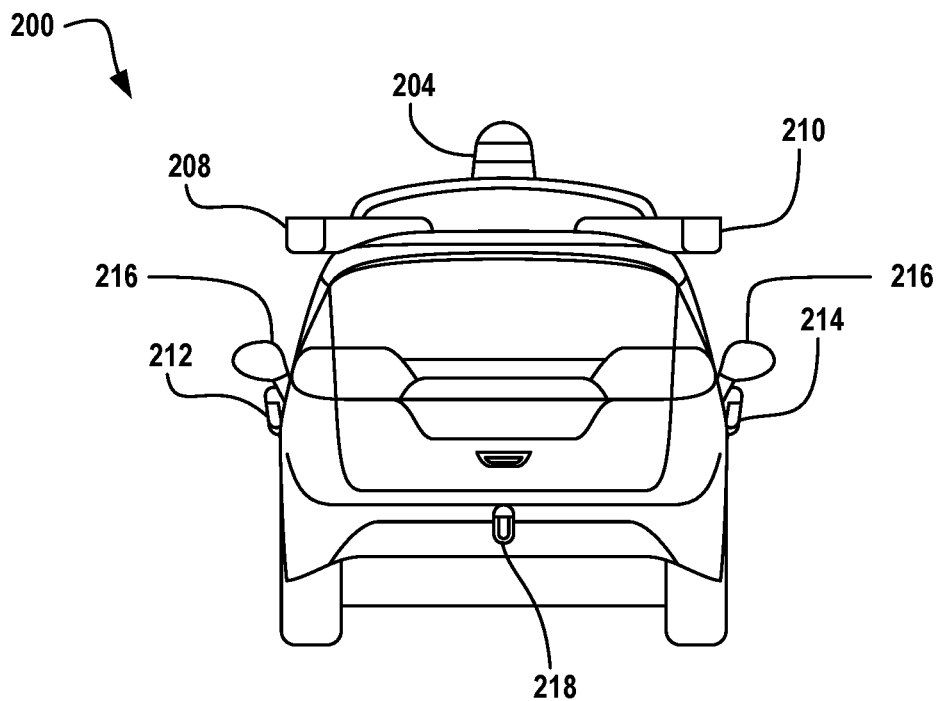
Figure 2E:
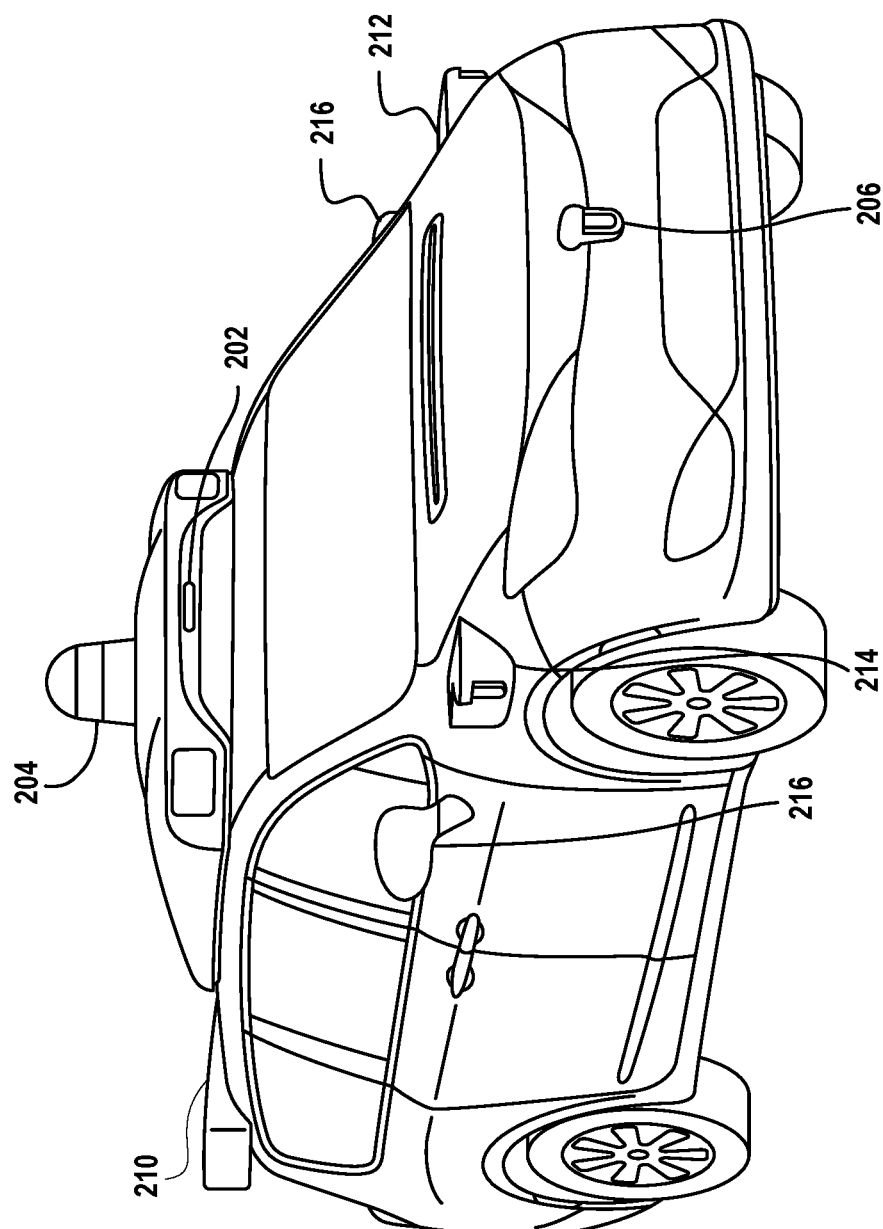

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

Vehicle systems, including robotic devices, include sensors that are used to perceive an environment and thus provide a basis for making various navigational and operational decisions. It may be desirable to evaluate whether the positioning and/or the capabilities of the sensors provided on the vehicle systems are sufficient and/or optimal for some tasks that the vehicle systems are tasked with performing. In particular, it may be desirable to perform such an evaluation before the vehicle systems are built and/or deployed to perform such tasks, thus allowing the vehicle systems to be equipped with sensors that allow performance of these tasks in a safe and accurate manner.

For example, a particular sensor may be mounted at a particular position on the vehicle system in order to provide sensor data for a particular task, such as the detection of other vehicles on a roadway, the perception of pedestrians in front of and/or around the vehicle, the determination of the state of a traffic control device, and so on. The particular sensor may provide sensor data that is sufficient and/or optimal for performing the particular task in some circumstances (e.g., at certain vehicle speeds, on roads having less than a 10% grade, etc.). It may be desirable to determine whether the sensor data is also sufficient and/or optimal in other circumstances (e.g., at higher vehicle speeds, on roads having more than a 15% grade, etc.) that might not have been anticipated and/or planned for when the particular sensor and/or its position on the vehicle system were initially selected.

Further, as the vehicle system is assigned additional tasks, it may be desirable to determine whether the sensor data generated by the particular sensor is sufficient and/or optimal for performing these additional tasks. For example, a forward-facing sensor initially used for the detection of other vehicles on the roadway might not have a view of some regions on the side of the vehicle. Thus, before assigning the vehicle system to perform an additional task, it may be desirable to evaluate whether the additional task involves detection of objects in the regions on the side of the vehicle that are not covered by the field of view of the forward-facing sensor. If so, one or more additional sensors may be installed and/or adjusted to cover the regions on the side of the vehicle before tasking the vehicle with performing the additional task.

Accordingly, a software application may be configured to evaluate the expected performance of sensors installed on a vehicle across a plurality of possible vehicle tasks, which may alternatively be referred to as "use cases". Each use case may correspond to a combination of one or more objects to which the vehicle is to respond, one or more maneuvers for the vehicle to perform as part of the use case, a set of road conditions in which the maneuver is to be performed, and/or a set of environmental conditions in which the use case is to be performed. For example, the use cases may include detection of other vehicles; detection of pedestrians, cyclists, and/or other road users; detection of traffic lights; detection of traffic signs; detection of channelizing devices (e.g., traffic cones, barricades, etc.); detection of foreign objects and/or debris on the road; and/or detection of other possible objects and/or environmental features.

The maneuvers may include combinations of stopping, decelerating, accelerating, merging, passing, and/or turning, among others. The maneuvers may also include additional parameters describing other constraints on the vehicle's behavior. For example, a "reaction" time may indicate how quickly the vehicle is configured to react to the presence of the one or more objects. The road conditions may include combinations of a roadway design speed (e.g., a maximum design speed), speed at which the roadway is intended to be traversed by the vehicle (e.g., a maximum posted speed), a number of lanes in the roadway, a slope (i.e., grade) of the roadway, and/or a turn radius of the roadway, among others. In particular, a full parametric description of the roadway may be incorporated into a description of the road conditions. The environmental conditions may include a time of day, lighting conditions, and/or weather conditions, among others.

Specifically, the software application may be configured to compare a target specification map of a task to a capability specification map of a sensor. Each of these maps may define a plurality of regions around the vehicle. For example, the regions may be defined as three-dimensional voxels around the vehicle or as two-dimensional angular patches representing, for example, a "driver's view" and/or a "sensor's view" around the vehicle. The target specification map may indicate, for each respective region of the plurality of regions around the vehicle, a target value of a parameter of the sensor associated with performing a corresponding task. More particularly, the target specification map may indicate portions of the environment to be observed by the sensor, and a level of quality of the sensor's observations, that are desired to perform the corresponding task. As one specific example, the target specification map may indicate, for each of the plurality of regions around the vehicle, a corresponding target angular resolution of a camera device used for detecting a particular object in the environment.

The capability specification map may indicate, for each respective region of the plurality of regions around the vehicle, an attained value of the parameter that the sensor is configured to provide. That is, the capability specification map may indicate what parts of the environment the sensor is actually able to see and/or is expected to be able to see, and the quality with which the sensor actually sees and/or is expected to be able to see these parts. For example, the capability specification map may indicate, for each of the plurality of regions around the vehicle, a corresponding angular resolution that the camera device is capable of actually providing. As another example, the capability specification map may indicate, for each of the plurality of regions around the vehicle, a corresponding LIDAR point density available in that region and/or minimum reflectance of an object that could be detected in that region at a particular transmission power level.

By comparing the target specification map to the capability specification map, the software application may determine a disparity therebetween, which may be expressed as a disparity map. The comparison may involve, for example, a subtraction of the target specification map from the capability specification map (or vice versa), and/or a division of the capability specification map by the target specification map, among other possible comparisons. The disparity map may indicate a first subset of regions where the target value exceeds the attained value, thus indicating that the sensor is not capable of providing sensor data that is sufficient and/or optimal for the task, and a second subset of regions where the attained value meets or exceeds the target value, thus indicating that the sensor is capable of providing sensor data that is sufficient and/or optimal for the task. Thus, the software application may provide information indicating how to adjust the task and/or the sensor to allow for safe and accurate execution of the task.

The software application may be configured to determine the target specification map and/or the capability specification map empirically and/or based on simulations. For example, the target specification map may be determined empirically by collecting a plurality of sensor data captured in connection with performing the corresponding task (e.g., by vehicles in a fleet). The sensor data may then be evaluated to determine where instances of objects to be detected in connection with the task appear relative to the vehicle, and how attribute values (e.g., object size and shape, distance relative to the vehicle, speed relative to the vehicle, color, LIDAR reflectivity, RADAR cross-section, etc.) of the instances of the objects vary across the regions around the vehicle. Based on these position-dependent attribute values, the software application may determine the target values of the parameter of the sensor associated with capturing sensor data representing one or more instances of the object in various regions around the vehicle.

For example, the software application may process a plurality of images representing traffic lights from one or more vehicles' perspectives' and determine that, in general, distant traffic lights appear within +/−5 degrees of zero elevation in front of the vehicle, while nearby traffic lights appear above +5 degrees of elevation and below −5 degrees of elevation in front of the vehicle. Thus, the software application may determine that, in general, regions within +/−5 degrees of zero elevation in front of the vehicle are to be imaged with higher resolution than regions above +5 degrees of elevation and below −5 degrees of elevation in front of the vehicle. Specifically, based on a minimum image resolution of the traffic lights associated with successful detection of the traffic light and a maximum stopping distance of the vehicle, among other considerations, the software application may quantify, for each respective region around the vehicle, the specific angular resolution of the camera desired in the respective region. Thus, the target specification map may represent the sensor parameter values associated with successfully performing a task in empirically defined real-world use cases.

Alternatively, the target specification map may be determined through simulation by generating a plurality of candidate location of instances of the object relative to the vehicle. The relative locations may be based on locations of instances of the object in the environment and possible road conditions (e.g., the geometric properties of the road) between the vehicle and the instances of the object. Further, based on the plurality of candidate locations, the software application may determine one or more attribute values associated with the instances being represented across different regions around the vehicle. The software application may then use these attribute values to determine the target values of the sensor parameter across the different regions around the vehicle. Thus, the target specification map may represent the sensor parameter values associated with successfully performing the task in simulations of real-world use cases. In some examples, such simulation of real-world use cases may be used to generate the target specification map for use cases that are infrequently observed in the real world.

In some cases, the target specification map may be generated based on a combination of the empirical and simulation approaches. Additionally, as the task corresponding to a particular target specification map is modified, the target specification map may be regenerated. For example, the target specification map may be updated, and/or a new target specification map may be generated, based on modifications to vehicle maneuverability (e.g., maximum braking rate), road conditions (e.g., maximum roadway slope), and/or environmental conditions (e.g., time of day). This regeneration of the specification map may be done either offline, or it may be done in real-time on the vehicle in order to make real-time judgements about the abilities of the vehicle in a given situation.

The capability specification map may be generated by empirically measuring the field of view of the sensor and the parameter values that the sensor is capable of providing across the field of view, and/or by simulating the field of view and the parameter values. In some cases, the capability specification map may simultaneously represent the capabilities of a plurality of sensors provided on the vehicle. For example, the capability specification map may represent the capabilities of each sensor provided on the vehicle, thereby representing the sensing capabilities of the vehicle as a whole. When two or more sensors of the same type provide overlapping fields of view, the capability specification map may represent the capabilities of each of these two or more sensors. Alternatively, the capability specification map may represent the best and/or highest one of the capabilities of these two or more sensors.

The sensor provided on the vehicle may include camera devices, light detection and ranging (LIDAR) devices, and radio detection and ranging (RADAR) devices, among others. Thus, the fields of view of each sensor, and the specific parameters represented by the target specification map and/or the capability specification map may vary with sensor type.

II. EXAMPLE VEHICLE SYSTEMS

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robotic devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, RADAR 126, laser rangefinder/LIDAR 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

RADAR 126 may represent one or more systems configured to use radio signals to sense objects, including the speed and heading of the objects, within the local environment of vehicle 100. As such, RADAR 126 may include antennas configured to transmit and receive radio signals. In some embodiments, RADAR 126 may correspond to a mountable RADAR system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/LIDAR 128 may include one or more photodetectors. Such photodetectors may be especially sensitive detectors (e.g., avalanche photodiodes (APDs)). In some examples, such photodetectors may even be capable of detecting single photons (e.g., single-photon avalanche diodes (SPADs)). Further, such photodetectors can be arranged (e.g., through an electrical connection in series) into an array (e.g., as in a silicon photomultiplier (SiPM)).

Camera 130 may include one or more devices (e.g., still camera or video camera) configured to capture images of the environment of vehicle 100. Camera 130 may be a visible light camera, a thermal camera, a near-infrared (NIR) camera, and/or a short wave infrared (SWIR) camera, among other possibilities.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or 4G cellular communication, such as worldwide interoperability for microwave access (WiMAX) or long-term evolution (LTE). Alternatively, wireless communication system 146 may communicate with a wireless local area network (WLAN) using WiFi or other possible connections. Wireless communication system 146 may also communicate directly with a device using an infrared link, BLUETOOTH®, or ZIGBEE®, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, RADAR 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by other systems. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200. Vehicle 200 can use various types of sensors to navigate through an environment. Although vehicle 200 is illustrated in FIGS. 2A-2E as a van, the present disclosure is not so limited. For instance, vehicle 200 can represent a truck, a car, a semi-trailer truck, a motorcycle, a golf cart, an off-road vehicle, a farm vehicle, a robotic device, and/or an aerial vehicle, among other possibilities.

Vehicle 200 includes sensor units 202, 204, 206, 208, 210, 212, 214, 216, and 218 (i.e., sensor units 202-218), each of which may include a respective combination of one or more of a RADAR device, a LIDAR device, a laser rangefinder device, a camera device (e.g., a visible light camera, a thermal camera, an NIR camera, and/or a short wave infrared (SWIR) camera), and/or other types of sensors. Sensor units 202-218 can actively scan the surrounding environment for the presence of potential obstacles.

For example, sensor unit 202 is mounted atop vehicle 200 and includes one or more sensors configured to detect information about an environment surrounding vehicle 200, and output indications of the information. Sensor unit 202 can include one or more movable mounts that could be operable to adjust the orientation of one or more sensors in sensor unit 202. In one embodiment, the movable mount could include a rotating platform that could scan sensors so as to obtain information from each direction around vehicle 200. In another embodiment, the movable mount of sensor unit 202 could be movable in a scanning fashion within a particular range of angles and/or azimuths. Sensor unit 202 could be mounted atop the roof of a car, although other mounting locations are possible.

Additionally, the sensors of sensor unit 202 could be distributed in different locations and need not be collocated in a single location. Furthermore, each sensor of sensor unit 202 can be configured to be moved or scanned independently of other sensors of sensor unit 202.

Sensor units 208, 210, and 218 can be located near the rear of vehicle 200, to actively scan the environment near the back of vehicle 200 for the presence of objects. Similarly, sensor units 212, 214, and 206 may be mounted near the front of vehicle 200 to actively scan the environment near the front of vehicle 200. These sensor units can be situated, for example, in a location suitable to scan/view a region including a forward-moving path of vehicle 200 without occlusion by other features of vehicle 200. For example, sensors can be embedded in and/or mounted in or near the front bumper, front headlights, cowl, and/or hood, etc. Furthermore, one or more additional sensors can be located to actively scan the side (e.g., sensor units 216) and/or rear of vehicle 200 for the presence of objects, such as by including such devices in or near the rear bumper, side panels, rocker panels, and/or undercarriage, etc.

Although not shown in FIGS. 2A-2E, vehicle 200 can include a wireless communication system. The wireless communication system may include wireless transmitters and receivers that could be configured to communicate with devices external or internal to vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

Sensor units 202-218 can include one or more cameras. A camera can be a photosensitive instrument, such as a still camera, a video camera, etc., that is configured to capture a plurality of images of the environment of vehicle 200. To this end, the camera can be configured to detect visible light, and can additionally or alternatively be configured to detect light from other portions of the electromagnetic spectrum, such as infrared or ultraviolet light. The camera can be a two-dimensional detector, and can optionally have a three-dimensional spatial range of sensitivity.

In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, vehicle 200 can determine the distance to the points on the object. In another example, the camera may be a stereoscopic camera that allows distance to be measured based on pixel disparity.

A control system of vehicle 200 may be configured to control vehicle 200 in accordance with a control strategy from among multiple possible control strategies. The control system may be configured to receive information from sensors coupled to vehicle 200 (on or off vehicle 200), modify the control strategy (and an associated driving behavior) based on the information, and control vehicle 200 in accordance with the modified control strategy. The control system further may be configured to monitor the information received from the sensors, and continuously evaluate driving conditions; and also may be configured to modify the control strategy and driving behavior based on changes in the driving conditions.

III. EXAMPLE DRIVING SCENARIO

Figure 3A:
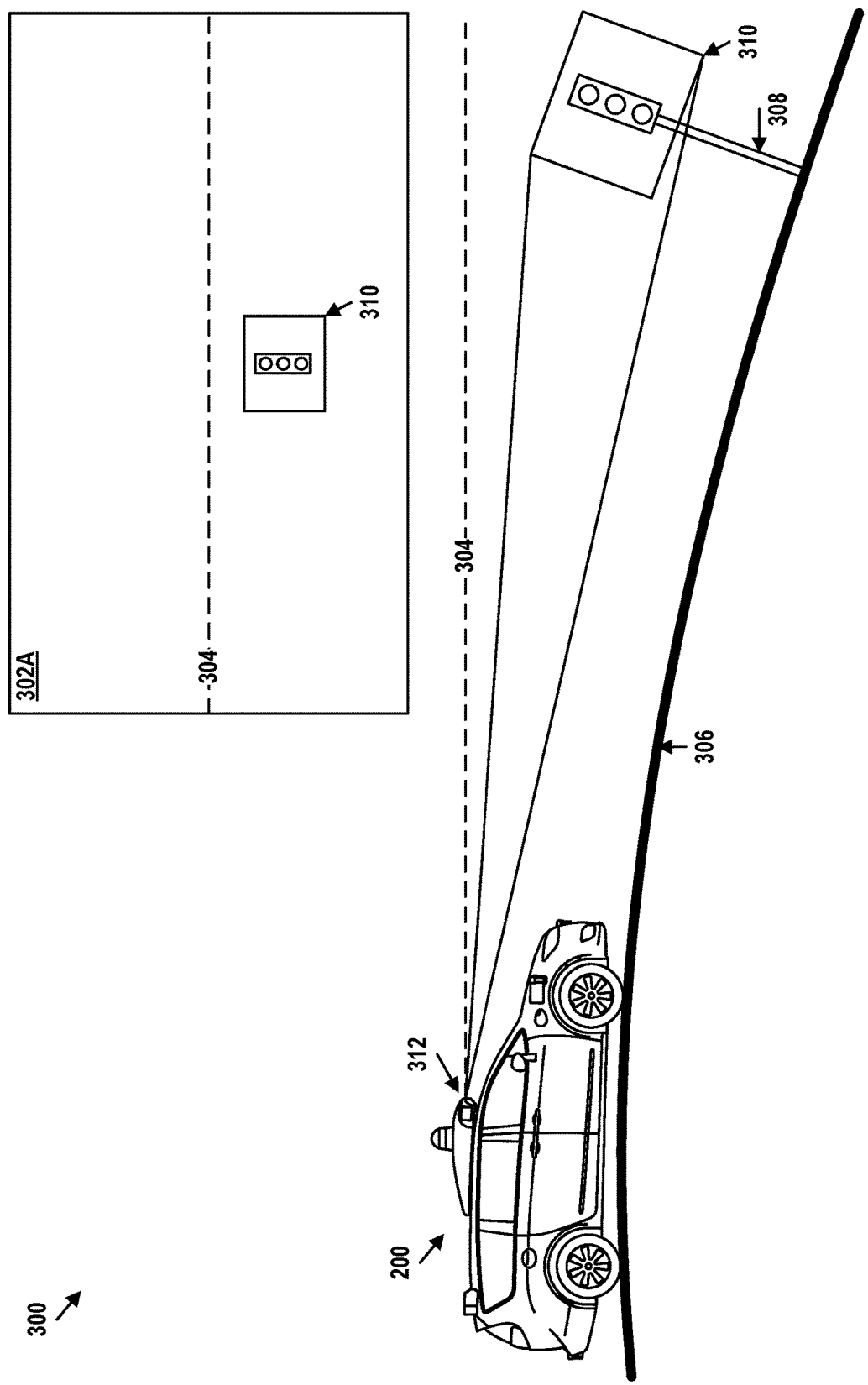
FIGS. 3A, 3B, and 3C illustrate a driving scenario, in accordance with example embodiments.
Figure 3B:
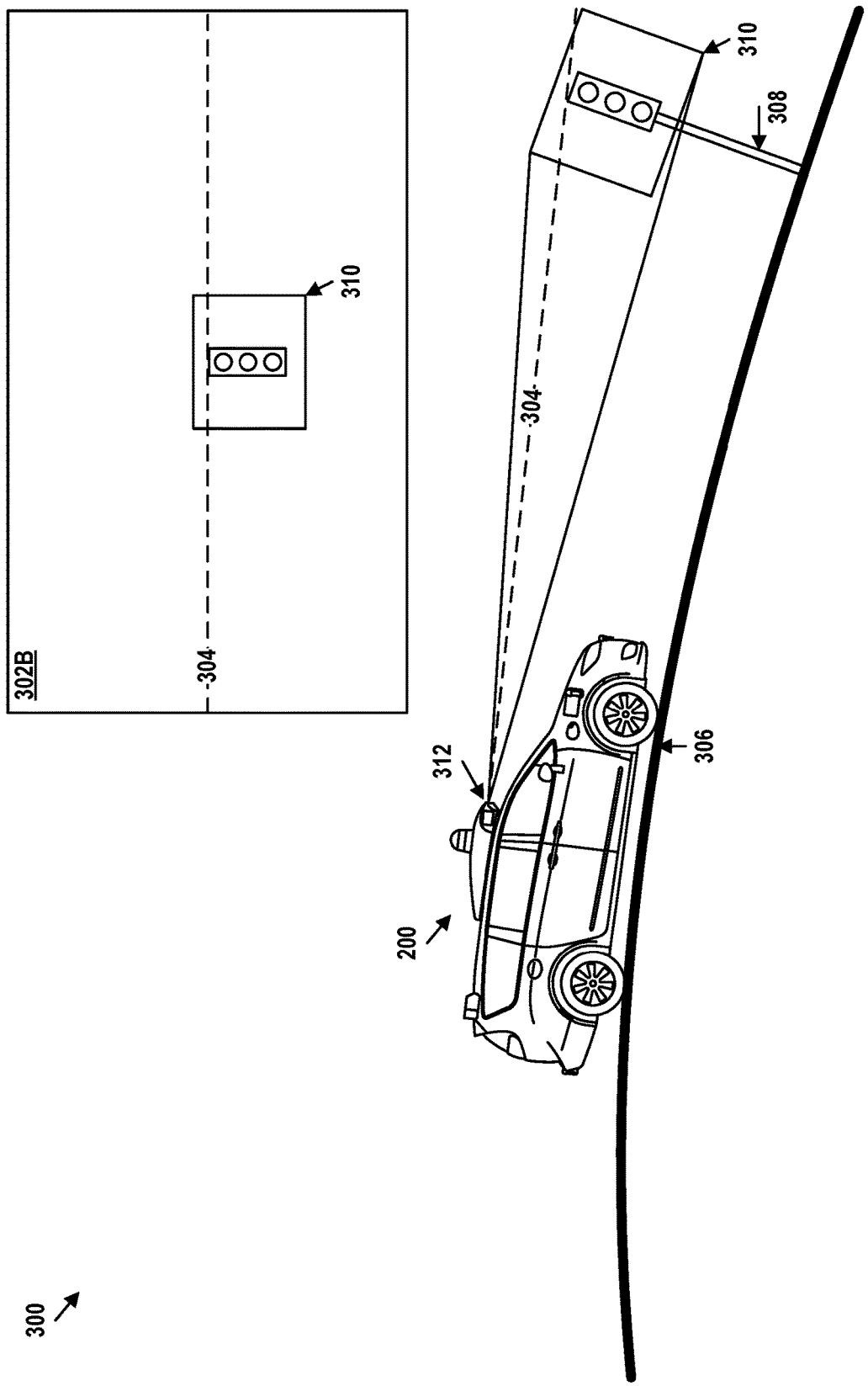
Figure 3C:
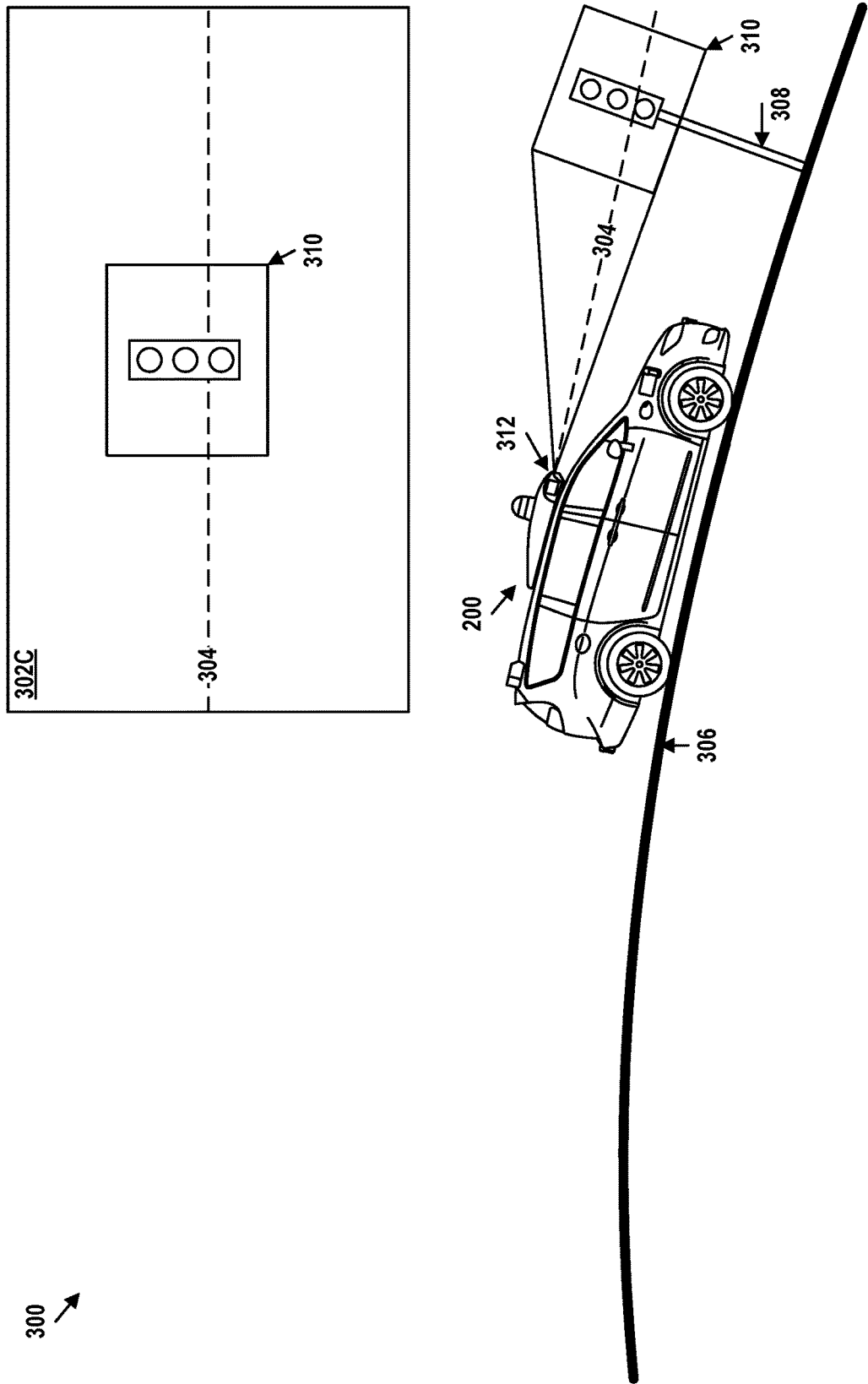

FIGS. 3A, 3B, and 3C illustrate example scenario 300 in which vehicle 200 is driving along road 306 towards traffic light 308. As discussed with respect to FIGS. 2A-2E, vehicle 200 may include thereon a plurality of sensor units, each of which may include one or more sensors. Sensor 312 may be positioned in, for example, sensor unit 202, and may have at least part of its field of view directed at traffic light 308 and region 310 therearound. Reference line 304 may represent a zero elevation angle in a reference frame of sensor 312. Thus, reference line 304 may correspond to a line that divides a sensor data frame generated by sensor 312 into two vertical halves, as illustrated by sensor data frames 302A, 302B, 302C shown in FIGS. 3A, 3B, and 3C, respectively.

In scenario 300, vehicle 200 may be tasked with operating in accordance with traffic light 308. For example, vehicle 200 may be tasked with stopping at a particular distance before traffic light 308 when traffic light 308 displays a red light. While moving towards traffic light 308 along road 306, vehicle 200 may be allowed to operate at speeds up to a predefined maximum speed and may be able to brake at rates up to a maximum braking rate. Further, there may be a delay, which may be referred to as a vehicle reaction time, between (i) capturing one or more sensor data frames that represent traffic light 308 with sufficient and/or optimal quality for detection and (ii) application of the brake and/or achievement of the maximum braking rate.

The vehicle reaction time, maximum speed, maximum braking rate, and the particular distance at which vehicle 200 is to stop may thus define a minimum stopping distance between vehicle 200 and traffic light 308. In some cases, the minimum stopping distance may alternatively be referred to as a minimum detection distance. Specifically, when one or more sensor data frames captured at or before the minimum stopping distance represent traffic light 308 in sufficient and/or optimal detail to allow for detection thereof, vehicle 200 may be expected and/or guaranteed to be able to stop at the particular distance in front of traffic light 308. On the other hand, when the one or more sensor data frames captured at or before the minimum stopping distance do not represent traffic light 308 in sufficient and/or optimal detail to allow for detection thereof, vehicle 200 might not be expected and/or guaranteed to be able to stop at the particular distance in front of traffic light 308.

The level of sensor data frame detail and/or quality associated with successful and/or optimal detection of traffic light 308 may depend on the type of sensor data. For example, when the sensor is a camera, the level of detail and/or quality may be expressed as a minimum number of pixels representing each circular signal indicator (e.g., light) of traffic light 308. In some instances, twenty five or more pixels spanning the area of each circular signal indicator of traffic light 308 (e.g., five pixels spanning a diameter of each circular signal indicator) may be sufficient to detect traffic light 308 and determine which one of the circular signal indicators thereof is illuminated (e.g., red light, orange light, or green light). In another example, when the sensor is a LIDAR, the level of detail may be expressed as a minimum number of LIDAR light pulses reflected from traffic light 308 (i.e., a target LIDAR point density).

Scenario 300 and sensor data frames 302A, 302B, and 302C illustrate that the size, resolution, and position, among other attributes, of region 310 within sensor data frames 302A, 302B, 302C vary as a function of the relative position and orientation between traffic light 308 and sensor 312 on vehicle 200. Thus, the level of detail and/or quality associated with successful detection of traffic light 308 might not be uniform across the field of view of sensor 312. Depending on the minimum stopping distance, traffic light 308 may appear in different portions of the sensor data frame and with different resolutions while allowing for detectability thereof. In general, the values of one or more sensor parameters associated with sufficient and/or optimal representation of an object as part of performance of a given task may vary spatially with respect to vehicle 200 based on various factors, including road conditions, environmental conditions, and/or vehicle maneuverability, among others.

For example, when vehicle 200 is relatively far away from traffic light 308, as shown in FIG. 3A, region 310 may be represented in a lower portion of sensor data frame 302A. Further, due to the relatively large distance between vehicle 200 and traffic light 308, region 310 may take up a relatively small portion of sensor data frame 302A. Thus, if the minimum stopping distance were that shown in FIG. 3A (e.g., due to high vehicle speeds and/or low braking rates), then the values of one or more parameters of sensor 312 are to be sufficient to detect traffic light 308 within sensor data frame 302A. For example, if the sensor is a camera, an angular resolution of the camera should be sufficient in the portion of sensor data frame 302B representing region 310 to allow for detection of traffic light 308 at this stopping distance.

As vehicle 200 reaches a location closer to traffic light 308, as shown in FIG. 3B, region 310 may, due to the curvature of road 306 and the decreasing distance, appear to move up within the sensor data frame. Thus, region 310 may be represented near a middle portion of sensor data frame 302B. Specifically, in sensor data frame 302B, reference line 304 may be approximately coincident with a topmost portion of a representation of traffic light 308 in region 310. Further, due to the decreasing distance between vehicle 200 and traffic light 308, region 310 may take up an increasing portion of sensor data frame 302B relative to sensor data frame 302A.

Thus, if the minimum stopping distance were that shown in FIG. 3B (e.g., due to moderate vehicle speeds and/or moderate braking rates), then the values of one or more parameters of sensor 312 could be less stringent (e.g., associated with generation of sensor data of lower quality) than those associated with FIG. 3A. For example, if sensor 312 is a camera, the angular resolution thereof could be expressed as radians per pixel or degrees of pixel, with higher angular resolutions being associated with image data of lower quality and lower angular resolutions being associated with image data of higher quality. Thus, the angular resolution of sensor 312 could be, relative to the portions of sensor data frame 302A representing region 310, higher (resulting in image data of lower quality due to each pixel representing a larger angular portion of a scene) in the portion of sensor data frame 302B representing region 310 while still allowing for detection of traffic light 308 at this stopping distance.

When vehicle 200 reaches a location that is relatively close to traffic light 308, as shown in FIG. 3C, region 310 may, due to the curvature of road 306 and the decreasing distance, appear to move further up within the sensor data frame. Thus, region 310 may appear to cross over the middle portion of sensor data frame 302C and into the top portion thereof. Specifically, in sensor data frame 302C, reference line 304 may be approximately coincident with a top of a representation of a bottommost circular signal indicator of traffic light 308 in region 310. Further, due to the decreasing distance between vehicle 200 and traffic light 308, region 310 may take up an even larger portion of sensor data frame 302C relative to sensor data frame 302B.

Thus, if the minimum stopping distance were that shown in FIG. 3C (e.g., due to low vehicle speeds and/or high braking rates), then the values of one or more parameters of sensor 312 could be relatively less stringent (e.g., associated with generation of sensor data of lower quality) than those associated with FIGS. 3A and 3B. For example, if sensor 312 is a camera, the angular resolution thereof could be, relative to the portions of sensor data frames 302A and 302B representing region 310, higher (resulting in image data of lower quality due to each pixel representing a larger angular portion of a scene) in the portion of sensor data frame 302C representing region 310 while still allowing for detection of traffic light 308 at this stopping distance.

Accordingly, by collecting a set of training data that illustrates the various possible positions of traffic lights relative to vehicle 200, a software application may be used to define a target specification map that indicates, for a plurality of regions around vehicle 200, sufficient and/or optimal sensor parameter values associated with detection of traffic lights in these regions. Although the detection of traffic lights is used herein as an example task for vehicle 200, the same process may be applied to a variety of other tasks to determine sufficient and/or optimal sensor parameter values associated with detection of various other objects in a plurality of regions around vehicle 200. Additionally, detection of an object may include identification of the presence of an object in a particular region around the vehicle, and/or classification of the identified object into one or more categories, among other operations related to perception of objects.

IV. EXAMPLE TASK-SPECIFIC TRAINING DATA

Figure 4:
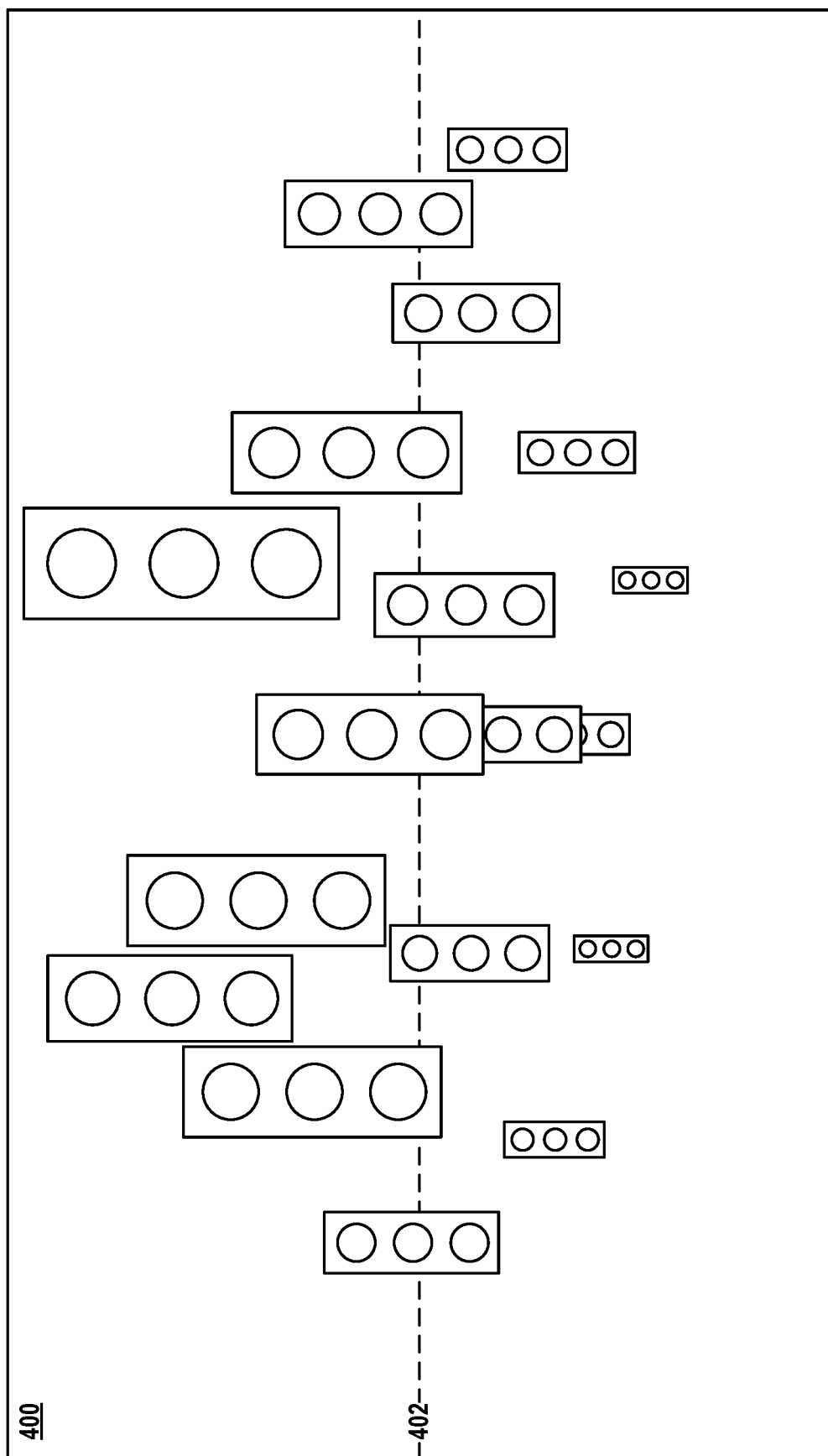
FIG. 4 illustrates training sensor data, in accordance with example embodiments.

FIG. 4 illustrates an example set of task-specific training data 400. Specifically, training data 400 is shown as an image containing therein representations of a plurality of traffic lights. Reference line 402 represents a middle of the image, and may correspond to reference line 304 of sensor 312 as shown in FIGS. 3A, 3B, and 3C. The representations of the traffic lights in training data 400 indicate various possibilities of how the traffic lights could appear to vehicle 200 under driving conditions. Training data 400 could thus represent a compilation of representations of traffic lights identified in and extracted from a plurality of sensor data frames, such as from sensor data frames 302A, 302B, and/or 302C.

As can be seen from training data 400, the attributes of the traffic lights (e.g., their apparent size, as dictated by the relative pose between the traffic lights and vehicle 200) vary spatially across different regions around vehicle 200. Specifically, the representations of the traffic lights may be smallest near the bottom of the image representing training data 400, and may increase in size towards the top of the image, with the largest representations of the traffic lights positioned near the top of the image. Thus, much like sensor data frames 302A, 302B, and 302C, training data 400 shows that, in some (but not all) driving scenarios, traffic lights appear in the bottom half of the sensor data frame when they are relatively far away from vehicle 200, appear in the top half of the sensor data frame when they are relatively close by to vehicle 200, and appear near the middle of the sensor data frame when they at a relatively moderate distance to vehicle 200. Other training data that represents other driving scenarios may represent a different distribution of objects around vehicle 200.

A set of task-specific training data, such as training data 400, may thus be used to determine a spatial variation with respect to regions around vehicle 200 of values of one or more attributes of one or more objects to be detected in connection with a particular task. The specific attributes that are of interest may depend on the particular task and/or the type of sensor used in connection with the task. For example, the attributes may include a distance of an object relative to vehicle 200, a speed of the object relative to vehicle 200, a reflectivity of the object at wavelengths used by a LIDAR device, a reflectivity of the object at wavelengths used by a camera (e.g., visible light camera, near infrared camera, etc.), a RADAR cross-section of the object, a relative brightness of the object, and/or a distance between adjacent objects, among others. The spatial variation of the attribute values may be used to determine a spatial variation with respect to the regions around vehicle 200 of values for one or more sensor parameters that allow for generation of sensor data frames that are sufficient and/or optimal for detection of the one or more objects in connection with performing the particular task.

V. EXAMPLE SYSTEM

Figure 5:
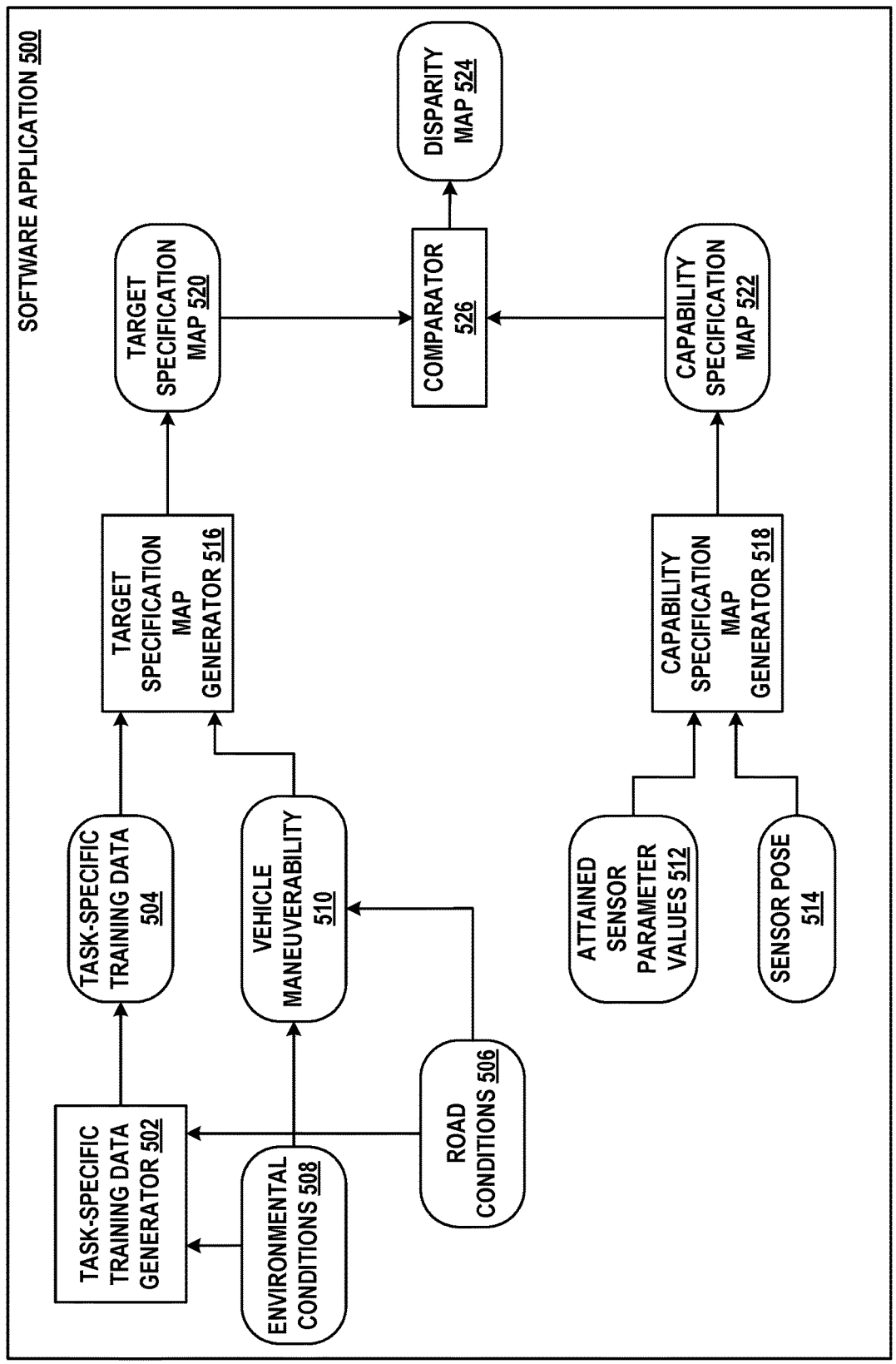
FIG. 5 illustrates a software application, in accordance with example embodiments.

FIG. 5 illustrates software application 500 that may be used to determine the spatial variation of sensor parameter values associated with successful and/or optimal object detection in connection with a particular task. Software application 500 includes task-specific training data generator 502, target specification map generator 516, capability specification map generator 518, and comparator 526, each of which may represent one or more instructions configured to perform the operations described herein. In some implementations, aspects of software application 500 may additionally and/or alternatively be implemented as hardware. Thus, blocks 502, 516, 518, and 526 may additionally and/or alternatively represent circuitry configured to perform the operations described herein.

Task-specific training data generator 502 may be configured to generate task-specific training data 504, which may be visually represented similarly to training data 400. Task-specific training data 504 may indicate where, relative to vehicle 200, instances of an object are expected to appear and, for each respective location relative to vehicle 200 where an instance of the object is expected to appear, one or more attributes associated with the instance of the object at the respective location. Thus, task-specific training data 504 may represent a spatial variation relative to vehicle 200 of one or more attributes associated with instances of one or more objects to be detected in connection with a corresponding task. Task-specific training data 504 may be represented, for example, in a reference frame of vehicle 200, among other possible reference frames.

Task-specific training data 504 may be "task-specific" in that it may represent sensor data frames captured and/or expected to be captured in connection with vehicle 200 performing a corresponding task, which may involve detecting one or more instances of one or more objects. For example, the detected object may be a traffic cone, and the task may involve maneuvering to avoid the traffic cone. Accordingly, task-specific training data 504 may represent the various ways in which instances of a traffic cone may appear relative to vehicle 200, but might not represent other types of objects (e.g., traffic lights). In another task, the detected object may be a traffic light and the task may involve stopping and/or moving in accordance with the color of the traffic light. Thus, in this case, task-specific training data 504 may represent the various ways in which instances of traffic lights may appear relative to vehicle 200, but might not represent other types of objects (e.g., traffic cones).

Task-specific training data 504 may represent the one or more instances of the one or more objects throughout at least a threshold portion of the one or maneuvers associated with the corresponding task. Thus, software application 500 may be configured to verify that the one or more instances of the one or more objects remain detectable throughout at least the threshold portion of the one or maneuvers. For example, task-specific training data 504 may represent the one or more instances of the one or more objects from initial detection thereof until completion of the one or maneuvers.

In some implementations, task-specific training data generator 502 may be configured to empirically generate task-specific training data 504. Specifically, task-specific training data 504 may be generated based on a plurality of sensor data frames collected by one or more vehicles while driving through various environments, and may thus represent real-world driving conditions. For example, task-specific training data generator 502 may be configured to filter the plurality of sensor data frames to identify a subset thereof that includes one or more sensor data frames representing one or more instances of one or more objects to be detected in connection with a corresponding task. The one or more instances of objects may be extracted from the subset and grouped together (e.g., as illustrated by training data 400) to define task-specific training data 504. Values of attributes of the instances of objects may be measured by various sensors on the one or more vehicles collecting the plurality of sensor data frames, and may thus be represented as part of task-specific training data 504.

In other implementations, task-specific training data generator 502 may be configured to generate task-specific training data 504 by way of one or more simulations. Specifically, task-specific training data generator 502 may be configured to generate a plurality of virtual environments representing a corresponding plurality of possible real-world environments in which vehicle 200 may operate. The plurality of virtual environments may indicate various possible positions of instances of objects relative to vehicle 200 and various possible attributes of the instances of the objects. The possible position and possible attributes may be generated to mimic positions and attributes expected to be encountered by vehicle 200 under real-world driving conditions. Based on the plurality of virtual environments, task-specific training data generator 502 may be configured to generate a task-specific training data 504.

In some implementations, task-specific training data 504 may be generated based on road conditions 506 and/or environment conditions 508, each of which may be adjustable (e.g., by users of software application 500). Road conditions 506 may define, for example, a maximum slope/grade of roads that vehicle 200 is expected to operate on, a maximum allowable speed on the roads, a minimum turn radius of the roads, and/or a maximum number of traversable lanes on the roads, among other aspects of the roads. The maximum slope/grade may be defined with respect to the direction of travel on the roads (e.g., indicating elevation changes of the roads) and/or with respect to a direction transverse to the direction of travel (e.g., indicating an extent of banking of the roads). Environmental conditions 508 may define, for example, weather conditions under which vehicle 200 is expected to operate, time of day when vehicle 200 is expected to operate, an extent of solar illumination, and/or the presence of moisture (e.g., fog), smoke (e.g., car exhaust), and/or other substances suspended in the atmosphere, among other attributes of the environment.

Task-specific training data 504 may thus indicate how instances of objects to be detected in connection with a corresponding task appear relative to vehicle 200 under road conditions 506 and environmental conditions 508. Accordingly, task-specific training data 504 might not indicate how instances of the objects appear under conditions that fall outside of the scope defined by road conditions 506 and/or environmental conditions 508. For example, task-specific training data 504 may represent the appearances of instances of objects up to and including a road grade of 20%, but might not indicate the appearances of the instances of the objects for road grades in excess of 20%. Thus, various instances of task-specific training data 504 may be defined for various combinations of road conditions 506 and/or environmental conditions 508. In some cases, road conditions 506 and/or environmental conditions 508 may be broadly defined to include any possible set of conditions expected to be encountered by vehicle 200.

Vehicle maneuverability 510 may define one or more kinematic and/or dynamic properties of vehicle 200. Thus, vehicle maneuverability 510 may indicate a maximum braking rate of vehicle 200, a maximum acceleration rate of vehicle 200, a maximum speed of vehicle 200, a merging rate of vehicle 200 (e.g., expressed as a maximum sideways speed when merging), a minimum turning radius of vehicle 200, and/or a minimum extent of space occupied by vehicle 200, among others. Thus, vehicle maneuverability 510 may indicate how quickly vehicle 200 is able to adjust its motion based on and/or in response to detection of one or more objects.

In some cases, vehicle maneuverability 510 may be based on road conditions 506 and/or environmental conditions 508. For example, road conditions 506 may define a speed limit associated with the roads on which vehicle 200 is expected to operate, which may in turn define the maximum speed for vehicle 200. In another example, a maximum breaking rate indicated by vehicle maneuverability 510 may be lower when environmental conditions 508 indicate the presence of precipitation (e.g., snow or rain) than in the absence of precipitation.

Target specification map generator 516 may be configured to generate target specification map 520 based on task-specific training data 504 and vehicle maneuverability 510. Specifically, target specification map 520 may indicate, for each respective region of a plurality of regions around vehicle 200, a sensor parameter value with which the respective region is to be scanned to obtain sensor data that is sufficient and/or optimal for performance of a corresponding task. Vehicle maneuverability 510 may indicate how quickly vehicle 200 is able to perform one or more maneuvers associated with the corresponding task, thereby dictating a minimum distance between vehicle 200 and the object associated with the task when the object is detected in order to allow for completion of the maneuver. Task-specific training data 504 may indicate how appearance of the object varies with respect to the plurality of regions, thus allowing for determination of sensor parameter values that are sufficient and/or optimal for detection of the object at or before the minimum distance.

In some implementations, the plurality of regions around vehicle 200 indicated by target specification map 520 may include a plurality of three-dimensional regions of space within a sphere, cube, or other volume centered around vehicle 200. Thus, each region may be represented as, for example, a voxel or another representation of subsets of the volume centered around vehicle 200. In one example, the position of each region relative to vehicle 200 may be represented by sets of three Cartesian coordinates (e.g., x-coordinate, y-coordinate, and z-coordinate). In another example, the plurality of regions around vehicle 200 may be represented by sets of spherical or cylindrical coordinates (e.g., polar angle, azimuthal angle, and radial distance).

In other implementations, the plurality of regions around vehicle 200 indicated by target specification map 520 may include a plurality of two-dimensional regions of space representing sections of a surface of a sphere centered around vehicle 200. Thus, each region may be represented as, for example, a pixel or another representation of a subset of the surface of the sphere centered around vehicle 200. The position of each region relative to vehicle 200 may be represented by sets of two polar coordinates (e.g., elevation coordinate and azimuth coordinate). In other implementations, the target specification map 520 representing the plurality of regions around vehicle 200 may be represented by one or more generating functions configured to generate the values of target specification map 520.

Capability specification map generator 518 may be configured to generate capability specification map 522 based on attained sensor parameter values 512 and sensor pose 514. While target specification map 520 may represent the sensor parameter values that are sufficient and/or optimal for detection of instances of one or more objects in connection with a particular task, capability specification map 522 may indicate the sensor parameter values that one or more sensors are capable of delivering when installed on vehicle 200. Capability specification map 522 may be task-independent.

Sensor pose 514 may indicate the respective positions and orientations of one or more sensors with respect to vehicle 200. The one or more sensors may include sensors that are installed on vehicle 200 and/or sensors planned to be installed on vehicle 200. In some cases, the positions and/or orientations may be modifiable over time, and sensor pose 514 may thus represent the range of positions and/or orientations to which the one or more sensors are adjustable. Thus, sensor pose 514 may indicate a subset of the plurality of regions around vehicle 200 that is actually observable by the one or more sensors.

Attained sensor parameter values 512 may indicate one or more values of one or more sensor parameters that the one or more sensors are configured to provide. Attained sensor parameter values 512 may vary depending on the type of sensor. For example, when the sensor is a camera, attained sensor parameter values 512 may include values for an angular resolution of the camera, a dynamic range of the camera, a frame rate of the camera, magnification capabilities of the camera, and/or other parameters associated with the camera.

In another example, when the sensor is a LIDAR device, attained sensor parameter values 512 may include values for a minimum range measurable by the LIDAR device, a maximum range measurable by the LIDAR device expressed as a function of object reflectivity, a point density expressed as a function of object distance (e.g., scanned points per unit area at a given distance), and/or a beam size of light generated by the LIDAR device, among other parameters associated with the LIDAR device. In a further example, when the sensor is a RADAR device, attained sensor parameter values 512 may include values for a minimum range measurable by the RADAR device, a maximum range measurable by the RADAR device expressed as a function of RADAR cross-section, a minimum relative speed measurable by the RADAR device, a maximum relative speed measurable by the RADAR device, an angular accuracy of the RADAR device, and/or a minimum angular difference between two targets resolvable by the RADAR device, among other parameters of the RADAR device. Notably, task-specific training data 504 may be configured to allow target specification map generator 516 to determine spatially-varying target values for one or more of these sensor parameters.

The one or more values of the one or more sensor parameters may be constant or variable with respect to a field of view of a corresponding sensor. For example, an angular resolution of a camera may be uniform with respect to a field of view of the camera, but beam characteristics of a RADAR device may vary across the field of view of the RADAR device. Thus, capability specification map 522 may indicate, for each respective region of the plurality of regions around vehicle 200, (i) whether the respective region is within a field of view of a particular sensor and (ii) one or more sensor parameter values with which the respective region is scannable by the particular sensor.

In some embodiments, capability specification map generator 518 may be configured to generate capability specification map 522 further based on one or more illumination maps that represent, for each respective region of the plurality of regions around vehicle 200, an extent of illumination provided by one or more light sources on vehicle 200. For example, the light sources may include headlights of vehicle 200 and/or infrared illuminators provided on vehicle 200, among other possibilities. The illumination map may be used in combination with a measure of light sensitivity represented by attained sensor parameter values 512 to generate capability specification map 522 that indicates, for each respective region of the plurality of regions around vehicle 200, a minimum observable object reflectance.

Comparator 526 may be configured to determine disparity map 524 based on target specification map 520 and capability specification map 522. Specifically, comparator 526 may be configured to determine disparity map 524 by comparing capability specification map 522 and target specification map 520. In one example, the comparison performed by comparator 526 may include dividing capability specification map 522 by target specification map 520 (or vice versa). In another example, the comparison performed by comparator 526 may include subtracting target specification map 520 from capability specification map 522 (or vice versa). Other comparisons are possible. Thus, disparity map 524 may quantitatively represent a difference between, ratio of, and/or other comparative metric between specification map 522 and target specification map 520 (or vice versa). Disparity map 524 may alternatively be referred to as a difference map.

Accordingly, based on disparity map 524, software application 500 may be configured to identify regions of space around vehicle 200 where (i) the sensor parameter values attained by the one or more sensors meet or exceed the values indicated by target specification map 520 and/or (ii) the sensor parameter values attained by the one or more sensors fall short of the values indicated by target specification map 520. Thus, software application 500 may be configured to identify a first subset of the plurality of regions around vehicle 200 where the one or more sensors on vehicle 200 are capable of providing sensor data that is sufficient and/or optimal for performance of a particular task. Additionally, software application 500 may be configured to identify a second subset of the plurality of regions around vehicle 200 where the one or more sensors on vehicle 200 are not capable of providing sensor data that is sufficient and/or optimal for performance of the particular task.

VI. EXAMPLE TARGET SPECIFICATION, CAPABILITY SPECIFICATION, AND DISPARITY MAPS

Figure 6A:
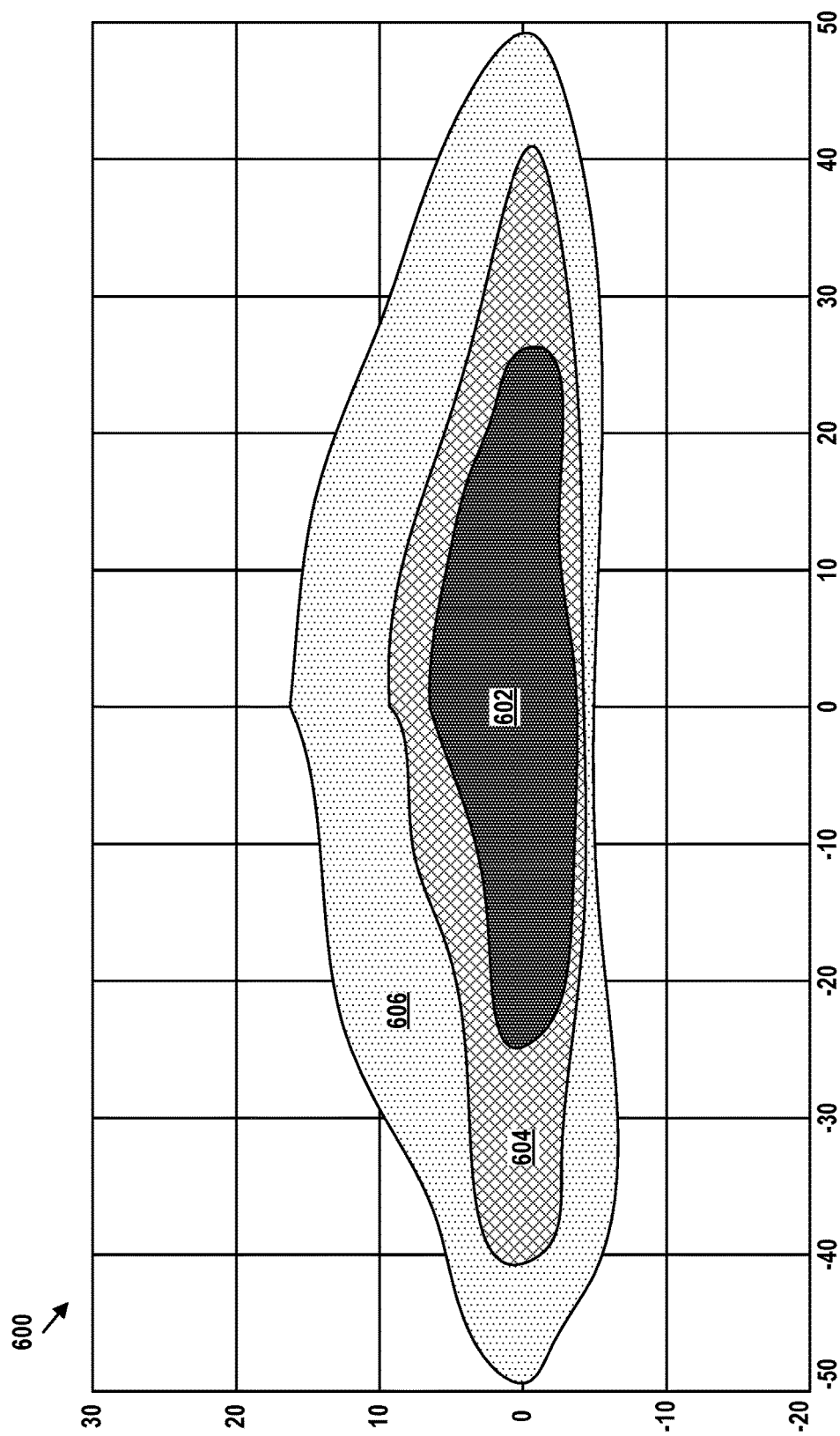
FIG. 6A illustrates a target specification map, in accordance with example embodiments.
Figure 6B:
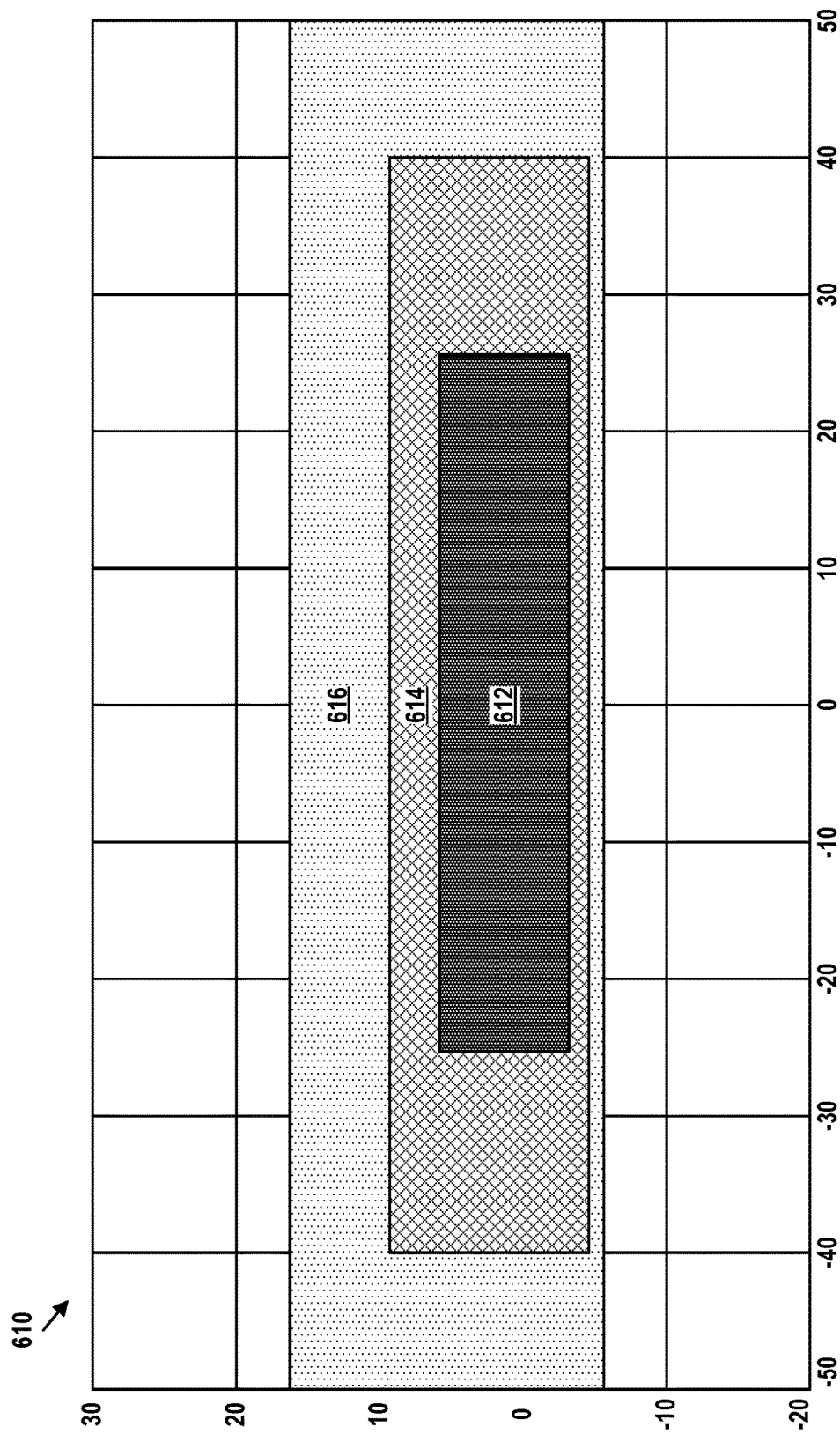
FIG. 6B illustrates a target specification map, in accordance with example embodiments.
Figure 6C:
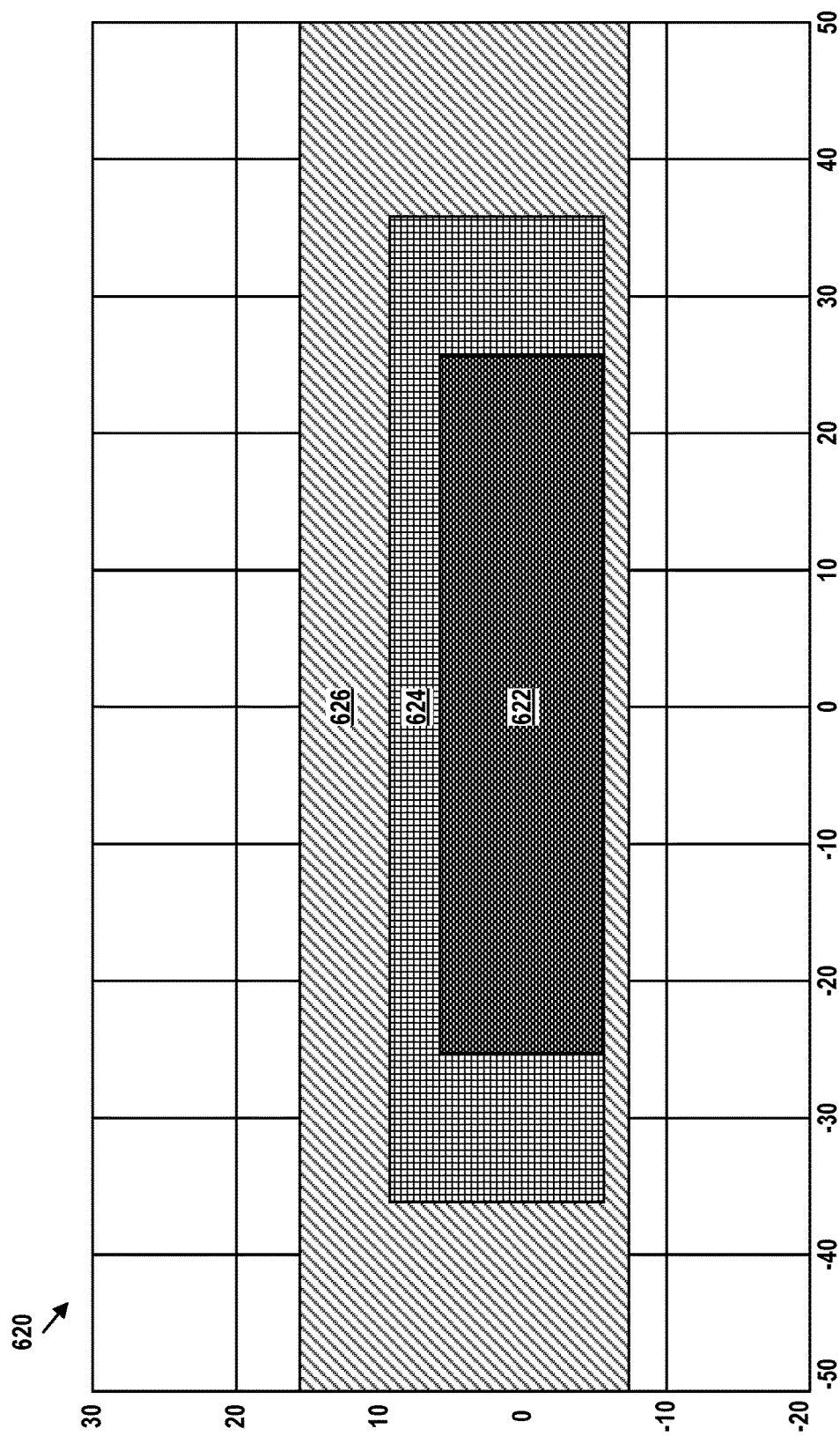
FIG. 6C illustrates a capability specification map, in accordance with example embodiments.
Figure 6D:
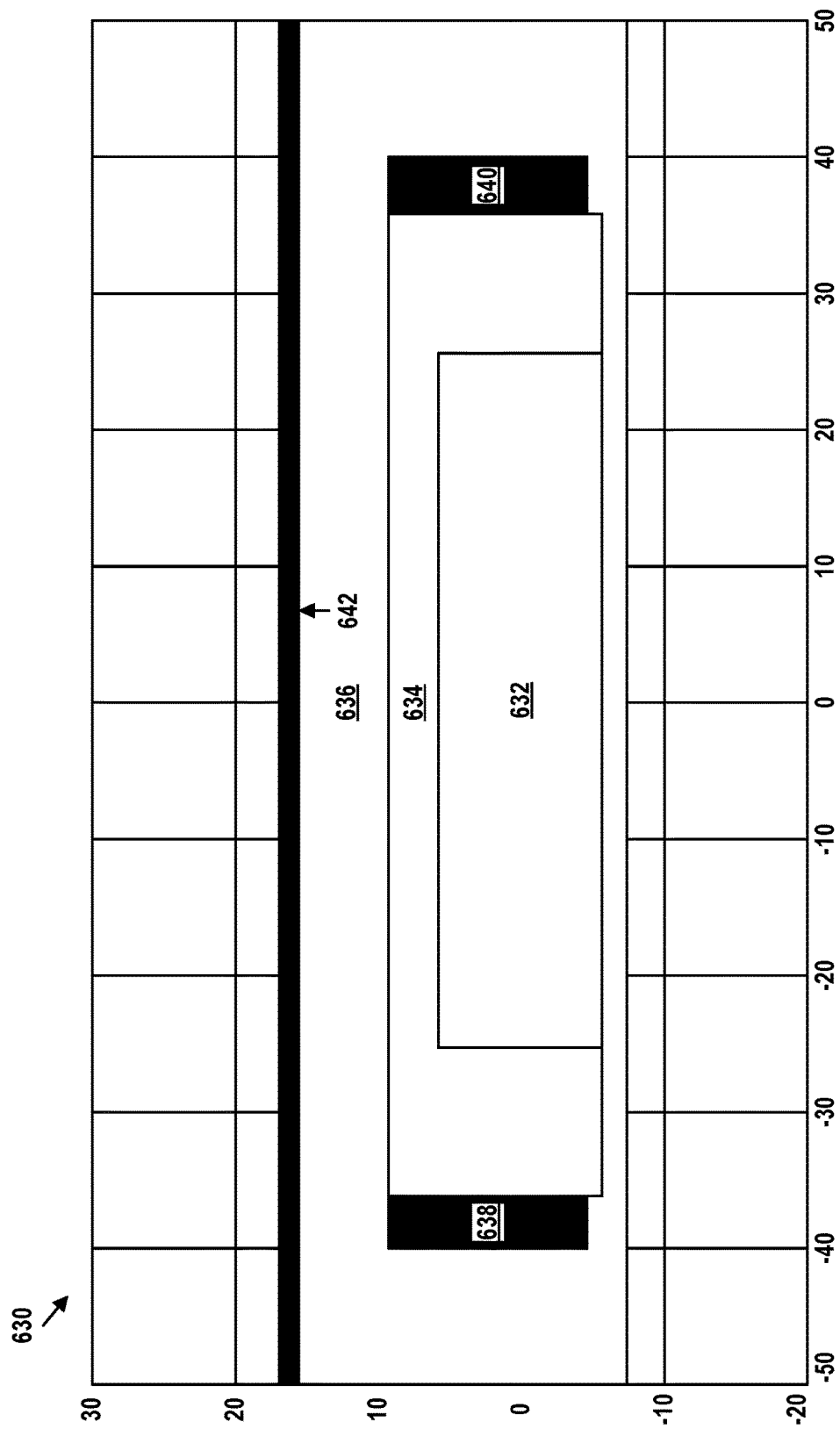
FIG. 6D illustrates a disparity map, in accordance with example embodiments.

FIGS. 6A and 6B illustrate examples of target specification map 520. FIG. 6C illustrates an example of capability specification map 522. FIG. 6D illustrates an example of disparity map 524. Specifically, FIGS. 6A, 6B, 6C, and 6D each illustrate a two-dimensional portion of the environment ranging from −20 degrees to 30 degrees along the elevation dimension and −50 degrees to 50 degrees along the azimuth dimension. Thus, FIGS. 6A, 6B, 6C, and 6D may be viewed as illustrative of a "sensor's view" of a portion of the environment. In some cases, the sensor's view may be similar to (e.g., overlap with) a "driver's view" of the potion of the environment.

Specifically, target specification map 600 shown in FIG. 6A includes therein region 602 indicated with a first fill pattern, region 604 indicated with a second fill pattern, and region 606 indicated with a third fill pattern. Each of regions 602, 604, and 606 may be further subdivided into smaller sub-regions spanning, for example, an area of 1 degree in elevation by 1 degree in azimuth, among other possibilities. The smaller sub-regions within each of regions 602, 604, and 606 may each be associated with a corresponding value (e.g., minimum or maximum, depending on the parameter) of the sensor parameter that is sufficient and/or optimal for detecting the instances of the objects in connection with a respective task. The corresponding value of each of the sub-regions may each be determined by one or more functions (e.g., a min function or a max function) configured to generate the corresponding value based on one or more values associated with the sub-region (e.g., provided along a third dimension (not shown) of the environment).

Thus, regions 602, 604, and 606 may each be associated with a corresponding range of sensor parameter values that are sufficient and/or optimal for detecting the instances of the objects in connection with the respective task. While regions 602, 604, and 606 are shown for clarity of illustration, in some cases, the actual computation of target specification map 600 and/or the disparity map based thereon may be carried out at the size scale of the smaller sub-regions.

For example, when target specification map 600 represents the angular resolution of a camera, region 602 may correspond to angular resolutions between 0.0 milliradians per pixel (mrad/pixel) and 0.3 mrad/pixel, region 604 may correspond to angular resolutions between 0.3 mrad/pixel and 0.6 mrad/pixel, and region 606 may correspond to angular resolutions between 0.6 mrad/pixel and 0.9 mrad/pixel. Thus, target specification map 600 may indicate that, in order to detect instances of objects in connection with successfully performing the respective task, the camera should resolve region 602 at no more than (i.e., not worse than) 0.3 mrad/pixel, region 604 at no more than 0.6 mrad/pixel, and region 606 at no more than 0.9 mrad/pixel.

Target specification map 600 may be empirically-determined based on sensor data frames captured by one or more vehicles while operating in real-world circumstances. Accordingly, regions 602, 604, and 606 are illustrated as having irregular shapes. On the other hand, target specification map 610 illustrated in FIG. 6B may be determined on the basis of simulations. Regions 612, 614, and 616 of target specification map 610 have more regular, approximately rectangular shapes, which may be caused by certain assumptions (e.g., about road geometry) made as part of the simulation. Regions 612, 614, and 616 may correspond to regions 602, 604, and 606, respectively. Specifically, much like regions 602, 604, and 606, regions 612, 614, and 616 may each be subdivided into smaller sub-regions, and may thus each be associated with a corresponding range of sensor parameter values sufficient and/or optimal for detection of instances of an object in connection with a corresponding task.

The differences in shape between regions 602, 604, 606 and 612, 614, and 616, respectively, may be due to at least some of the simulated sensor data frames being generated based on conditions that are not frequently, if ever, encountered in the real-world. For example, the at least some of the simulated sensor data frames may be based on positions of instances of objects that are not frequently, if ever, encountered in the real world and/or road geometries that are not frequently, if ever, encountered in practice, among other factors. In some cases, simulations based on different assumptions (e.g., that are more representative of real-world conditions) may result in regions 612, 614, and 616 more closely matching regions 602, 604, and 606, respectively. However, in spite of some differences between empirically-determined target specification map 600 and simulation-based target specification map 610, target specification maps 600 and 610 may generally be consistent with one another and indicate the same trend, as indicated by regions 602, 604, and 606 spanning approximately the same two-dimensional portions of the environment as regions 612, 614, and 616, respectively.

FIG. 6C illustrates capability specification map 620. Capability specification map 610 includes regions 622, 624, and 626, each of which may be further subdivided into smaller sub-regions. Each of these smaller sub-regions may be associated with one or more corresponding sensor parameter values that the sensor is actually capable of providing in that sub-region. Each sub-region may be grouped into regions 622, 624, or 626 based on the most aggressive/stringent sensor parameter value available for that sub-region. Thus, each of regions 622, 624, and 626 may be associated with a range of sensor parameter values that the sensor is actually capable of providing. Again, regions 622, 624, and 626 are used for clarity of illustration, and any computations that involve capability specification map 620 may be carried out at the size scale of the smallest sub-region thereof For example, when capability specification map 620 represents the angular resolution that one or more cameras are configured to provide, region 622 may correspond to angular resolutions between 0.0 mrad/pixel and 0.3 mrad/pixel, region 624 may correspond to angular resolutions between 0.3 mrad/pixel and 0.6 mrad/pixel, and region 626 may correspond to angular resolutions between 0.6 mrad/pixel and 0.9 mrad/pixel. Thus, capability specification map 600 may indicate that the one or more cameras are capable of resolving region 622 at between 0.0 mrad/pixel and 0.3 mrad/pixel, region 624 at between 0.3 mrad/pixel 0.6 mrad/pixel, and region 626 at between 0.6 mrad/pixel and 0.9 mrad/pixel. For example, region 626 may be provided by a first camera with a large field of view and a low resolution, region 624 may be provided by a second camera with a medium field of view and a medium resolution, and region 622 may be provided by a third camera with a small field of view and a high resolution.

By comparing target specification map 610 to capability specification map 620 (e.g., determining a ratio or difference therebetween), disparity map 630 may be determined, as illustrated in FIG. 6D. Disparity map 630 includes regions 632, 634, 636, 638, 640, and 642. Regions 632, 634, and 636 represent portions of the environment around vehicle 200 where the sensors on vehicle 200 are capable of providing sensor data that is sufficient and/or optimal for detection of the instances of the objects in connection with the corresponding task. Regions 638, 640, and 642 represent portions of the environment around vehicle 200 where the sensors on vehicle 200 might not be capable of providing sensor data that is sufficient and/or optimal for detection of the instances of the objects in connection with the corresponding task.

Specifically, regions 638 and 640 result from region 624 not extending sufficiently far to the left and right to span region 614 along the azimuth direction. Similarly, region 642 results from region 626 not extending sufficiently far to the top to span region 616 along the elevation direction. Thus, by increasing the field of view of one or more sensors to span regions 638, 640, and 642, vehicle 200 may be able to collect sensor data that is sufficient and/or optimal for performance of the task associated with target specification map 610. Accordingly, disparity map 630 indicates how to adjust the positioning and/or capabilities of sensors on vehicle 200 in order to provide sensor data that is sufficient and/or optimal for performance of one or more tasks expected to be assigned to the vehicle. Additionally or alternatively, disparity map 630 indicates how to adjust aspects of the one or more tasks in order to carry out the one or more adjusted tasks without exceeding the capabilities of the sensors on vehicle 200 (i.e., such that the sensors on vehicle 200 are able to provide sensor data that is sufficient and/or optimal for performance of the one or more adjusted tasks).

VII. EXAMPLE CHART OF RESULTS OF TASK-SPECIFIC ANALYSES

FIG. 7 illustrates table 700, which contains a plurality of results of comparisons between one or more capability specification maps and a plurality of task-specific target specification maps. Specifically, table 700 includes results for tasks 702-720 (i.e., tasks 702-704, 706-708, 710-712, 724-716, and 718-720). Tasks 702-720 may be grouped according to various categories. For example, tasks 702-704 may be associated with detection of road users, and may thus include detection of a pedestrian at various positions around vehicle 200 and performance of various maneuvers based on the detection of the pedestrian. Tasks 706-708 may be associated with detection of vehicles, and may thus include, detection of a vehicle at various positions around vehicle 200 and performance of various maneuvers based on the detection of the vehicle. Similarly, tasks 710-712 may be associated with detection of and operation based on traffic lights, tasks 714-716 may be associated with detection of and operation based on traffic signs, and tasks 718-720 may be associated with detection of and operation based on foreign objects. Other task categories are possible.

Tasks 702-720 may each be defined by way of software application 500 with various levels of granularity and/or detail. In one example, some of tasks 702-720 may be very general (e.g., detect a stop sign and stop), while others may be very detailed (e.g., stop for a pedestrian detected based on sensor data representing the pedestrian's head during daylight hours). In another example, tasks may be specific to a particular type of road users (e.g., adults, children, standing pedestrians, prone pedestrians, stationary pedestrians, moving pedestrians, skateboard riders, scooter riders, etc.) and/or particular types of vehicles (e.g., cars, motorcycles, trucks, etc.). A user may be able to use software application 500 to define the task at the desired level of detail, and software application may be configured to compile a set of training data that reflects the desired level of detail.

Table 700 also includes a plurality of road configurations (e.g., road conditions 506) under which tasks 702-720 may be performed. For example, the road configuration includes a maximum allowable speed, ranging from 0 miles per hour (MPH) to 75 MPH, a number of lanes, ranging from none to three, and a maximum grade, ranging from 5% to 23%. Table 700 further indicates the minimum or maximum sensor parameter value that is sufficient and/or optimal for allowing detection of instances of objects in connection with each task. In some cases, the sensor parameter values represented in table 700 may be expressed in different units than the units used by target specification map 520 and/or capability specification map 522. For example, maps 520 and 522 may indicate an angular resolution of a camera device (e.g., expressed in mrad/pixel), while table 700 may indicate a spatial resolution of the camera device (e.g., expressed in meters per pixel). Software application 500 may be configured to convert between various sets of units.

Each cell of the plurality of cells associated with each of tasks 702-720 may include therein a number that indicates a worst-case ratio between an attained sensor parameter value associated with a particular region in the capability specification map and a sensor parameter value associated with the particular region in a corresponding respective target specification map. Thus, a ratio of 1.0 indicates that the one or more sensors on the vehicle are capable of providing sensor data that is equal to the value indicated by each region in the target specification map. A ratio greater than 1.0 indicates that the one or more sensors are capable of providing sensor data that is better than indicated by each region in the target specification map. A ratio less than 1.0 indicates that, in at least one region around the vehicle, the one or more sensors are not capable of providing sensor data that is as good as indicated by at least one corresponding region in the target specification map.

Each cell of the plurality of cells associated with each of tasks 702-720 may be color coded to indicate the results of comparing the respective target specification map to the capability specification map. Such color coding may facilitate the identification of tasks for which the sensor data is sufficient and or optimal, and tasks for which the sensor data is not sufficient and/or optimal. For example, cells in table 700 associated with results below 1.0 may be filled in black, cells associated with results of 1.0 to 1.1 may be filled in dark grey, and cells associated with results above 1.1 may be filled in light gray. In practice, the black, dark grey, and light gray may instead be replaced by, for example, red, yellow, and green.

VIII. ADDITIONAL EXAMPLE OPERATIONS

Figure 8:
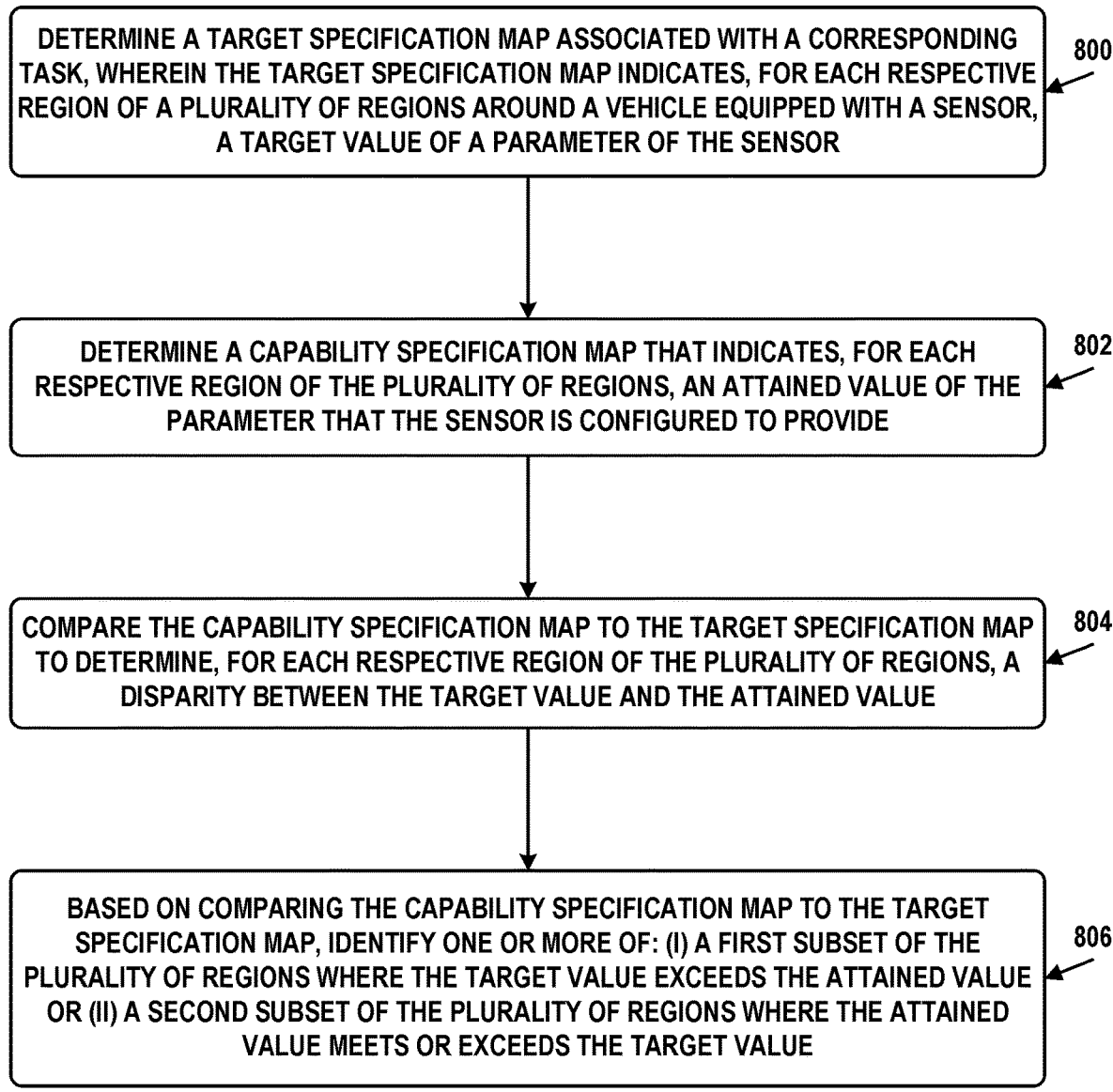
FIG. 8 illustrates a flow chart, in accordance with example embodiments.

FIG. 8 illustrates a flow chart of operations related to evaluating the capabilities of various sensors on a vehicle in connection with one or more tasks that the vehicle may perform. The operations may be carried out in connection with vehicle 100, vehicle 200, and/or the sensors thereof, among other possibilities. The operations may be carried out by software application 500 executing on one or more computing devices. For example, software application 500 could be executed by a desktop computer, a portable computer, and/or a server computer.

The embodiments of FIG. 8 may be simplified by the removal of any one or more of the features shown therein. Further, these embodiments may be combined with features, aspects, and/or implementations of any of the previous figures or otherwise described herein.

Block 800 may include determining a target specification map associated with a corresponding task. The target specification map may indicate, for each respective region of a plurality of regions around a vehicle equipped with a sensor, a target value of a parameter of the sensor.

Block 802 may include determining a capability specification map that indicates, for each respective region of the plurality of regions, an attained value of the parameter that the sensor is configured to provide.

Block 804 may include comparing the capability specification map to the target specification map to determine, for each respective region of the plurality of regions, a disparity between the target value and the attained value.

Block 806 may include, based on comparing the capability specification map to the target specification map, identifying one or more of: (i) a first subset of the plurality of regions where the target value exceeds the attained value or (ii) a second subset of the plurality of regions where the attained value meets or exceeds the target value.

In some embodiments, determining the target specification map associated with the corresponding task may include obtaining a plurality of sensor data representing instances of an object to be detected in connection with performing the corresponding task. Based on the plurality of sensor data and for each respective region of the plurality of regions, one or more attribute values may be determined. The one or more attribute values may be associated with one or more of the instances of the object being represented in the respective region by the plurality of sensor data. The target value of the parameter of the sensor may be determined for each respective region of the plurality of regions based on the one or more attribute values.

In some embodiments, the plurality of sensor data may be captured by one or more sensors on one or more vehicles and may represent the instances of the object from one or more points of view associated with the one or more vehicles.

In some embodiments, determining the target specification map associated with the corresponding task may include determining, for an object to be detected in connection with performing the corresponding task, a plurality of candidate locations of instances of the object relative to the vehicle. Based on the plurality of candidate locations of the instances of the object relative to the vehicle and for each respective region of the plurality of regions, one or more attribute values may be determined. The one or more attribute values may be associated with one or more of the instances of the object being represented in the respective region. The target value of the parameter of the sensor may be determined for each respective region of the plurality of regions based on the one or more attribute values.

In some embodiments, determining the plurality of candidate locations of the instances of the object relative to the vehicle may include determining a plurality of candidate locations of the instances of the object within an environment, determining a plurality of candidate road geometries within the environment between the vehicle and the instances of the object, and determining the plurality of candidate locations of the instances of the object relative to the vehicle based on the plurality of candidate location of the instances of the object within the environment and the plurality of candidate road geometries within the environment.

In some embodiments, determining the target specification map associated with the corresponding task may include determining a maneuver to be performed by the vehicle as part of the corresponding task in response to detection of an object. A minimum distance between the vehicle and the object that allows the vehicle to perform the maneuver may be determined. The target value of the parameter of the sensor may be determined for each respective region of the plurality of regions around the vehicle based on the minimum distance such that the object is detectable before the vehicle reaches the minimum distance between the vehicle and the object.

In some embodiments, the vehicle may be equipped with a plurality of sensors. Determining the capability specification map may include determining, for each respective region of the plurality of regions around the vehicle, the attained value of the parameter that the plurality of sensors is configured to provide based on a respective attained value of the parameter that each respective sensor of the plurality of sensors is configured to provide.

In some embodiments, determining the capability specification map may include determining, for each respective region of the plurality of regions around the vehicle, the attained value of the parameter that the sensor is configured to provide based on a position of the sensor on the vehicle.

In some embodiments, determining the capability specification map may include determining an illumination map that represent, for each respective region of the plurality of regions around the vehicle, a corresponding extent of illumination that one or more light sources on the vehicle are configured to provide. A corresponding light sensitivity value of the sensor may be determined for each respective region of the plurality of regions around the vehicle. A minimum reflectance of an object that the sensor is configured to detect may be determined for each respective region of the plurality of regions around the vehicle based on (i) the corresponding light sensitivity value and (ii) the corresponding extent of illumination.

In some embodiments, the plurality of regions around the vehicle may be represented in a reference frame of the vehicle.

In some embodiments, the sensor may be a camera, and the parameter of the sensor may include one or more of (i) an angular resolution of the camera, (ii) a dynamic range of the camera, or (iii) a frame rate of the camera.

In some embodiments, the sensor may be a LIDAR device, and the parameter of the sensor may include one or more of (i) a minimum range measurable by the LIDAR device, (ii) a maximum range measurable by the LIDAR device expressed as a function of reflectivity, (iii) a beam size of light generated by the LIDAR device, or (iv) a point density expressed as a function of object distance.

In some embodiments, the sensor may be a RADAR device, and the parameter of the sensor may include one or more of (i) a minimum range measurable by the RADAR device, (ii) a maximum range measurable by the RADAR device expressed as a function of RADAR cross-section, (iii) a minimum relative speed measurable by the RADAR device, (iv) a maximum relative speed measurable by the RADAR device, (v) an angular accuracy of the RADAR device, or (vi) a minimum angular difference between two targets resolvable by the RADAR device.

In some embodiments, it may be determined that the sensor is configured to provide sufficient sensor data for execution of the corresponding task based on the second subset of the plurality of regions including at least a threshold number of regions. Based on determining that the sensor is configured to provide sufficient sensor data for execution of the corresponding task, a visual indication of the sensor being configured to provide sufficient sensor data for execution of the corresponding task may be generated by way of a user interface.

In some embodiments, it may be determined that the sensor is configured to provide insufficient sensor data for execution of the corresponding task based on the first subset of the plurality of regions including at least a threshold number of regions. Based on determining that the sensor is configured to provide insufficient sensor data for execution of the corresponding task, a visual indication of the sensor being configured to provide insufficient sensor data for execution of the corresponding task may be generated by way of a user interface.

In some embodiments, the target specification map associated with the corresponding task may be based on road conditions that include one or more of (i) a number of traversable lanes, (ii) a maximum slope of the traversable lanes, or (iii) a minimum turn radius of the traversable lanes.

In some embodiments, instructions may be received and may indicate a modification to at least one of (i) the attained value of the parameter that the sensor is configured to provide for one or more regions of the plurality of regions, (ii) one or more road conditions on which the target specification map is based, (iii) one or more environmental conditions on which the target specification map is based, or (iv) a maneuverability of the vehicle when performing the corresponding task. One or more of the target specification map or the capability specification map may be updated based on the instructions indicating the modification. Based on the updating, the capability specification map may be compared to the target specification map to determine, for each respective region of the plurality of regions, an updated disparity between the target value and the attained value. Based on comparing the capability specification map to the target specification map, one or more of: (i) an updated first subset of the plurality of regions may be identified where the target value exceeds the attained value or (ii) an updated second subset of the plurality of regions may be identified where the attained value meets or exceeds the target value.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
   determining a target specification map associated with a corresponding task, wherein the target specification map indicates, for each respective region of a plurality of regions around a vehicle equipped with a sensor, a target value of a parameter of the sensor;
   determining a capability specification map that indicates, for each respective region of the plurality of regions, an attained value of the parameter that the sensor is configured to provide;
   comparing the capability specification map to the target specification map to determine, for each respective region of the plurality of regions, a disparity between the target value and the attained value; and
   based on comparing the capability specification map to the target specification map, identifying one or more of: (i) a first subset of the plurality of regions where the target value exceeds the attained value or (ii) a second subset of the plurality of regions where the attained value meets or exceeds the target value.

2. The computer-implemented method of claim 1, wherein determining the target specification map associated with the corresponding task comprises:
   obtaining a plurality of sensor data representing instances of an object to be detected in connection with performing the corresponding task;
   determining, based on the plurality of sensor data and for each respective region of the plurality of regions, one or more attribute values associated with one or more of the instances of the object being represented in the respective region by the plurality of sensor data; and
   determining, for each respective region of the plurality of regions, the target value of the parameter of the sensor based on the one or more attribute values.

3. The computer-implemented method of claim 2, wherein the plurality of sensor data is captured by one or more sensors on one or more vehicles and represents the instances of the object from one or more points of view associated with the one or more vehicles.

4. The computer-implemented method of claim 1, wherein determining the target specification map associated with the corresponding task comprises:
   determining, for an object to be detected in connection with performing the corresponding task, a plurality of candidate locations of instances of the object relative to the vehicle;
   determining, based on the plurality of candidate locations of the instances of the object relative to the vehicle and for each respective region of the plurality of regions, one or more attribute values associated with one or more of the instances of the object being represented in the respective region; and
   determining, for each respective region of the plurality of regions, the target value of the parameter of the sensor based on the one or more attribute values.

5. The computer-implemented method of claim 4, wherein determining the plurality of candidate locations of the instances of the object relative to the vehicle comprises:
   determining a plurality of candidate locations of the instances of the object within an environment;
   determining a plurality of candidate road geometries within the environment between the vehicle and the instances of the object; and
   determining the plurality of candidate locations of the instances of the object relative to the vehicle based on the plurality of candidate location of the instances of the object within the environment and the plurality of candidate road geometries within the environment.

6. The computer-implemented method of claim 1, wherein determining the target specification map associated with the corresponding task comprises:
   determining a maneuver to be performed by the vehicle as part of the corresponding task in response to detection of an object;
   determining a minimum distance between the vehicle and the object that allows the vehicle to perform the maneuver; and
   determining, for each respective region of the plurality of regions around the vehicle, the target value of the parameter of the sensor based on the minimum distance such that the object is detectable before the vehicle reaches the minimum distance between the vehicle and the object.

7. The computer-implemented method of claim 1, wherein the vehicle is equipped with a plurality of sensors, and wherein determining the capability specification map comprises:
   determining, for each respective region of the plurality of regions around the vehicle, the attained value of the parameter that the plurality of sensors is configured to provide based on a respective attained value of the parameter that each respective sensor of the plurality of sensors is configured to provide.

8. The computer-implemented method of claim 1, wherein determining the capability specification map comprises:
   determining, for each respective region of the plurality of regions around the vehicle, the attained value of the parameter that the sensor is configured to provide based on a position of the sensor on the vehicle.

9. The computer-implemented method of claim 1, wherein determining the capability specification map comprises:
   determining an illumination map that represent, for each respective region of the plurality of regions around the vehicle, a corresponding extent of illumination that one or more light sources on the vehicle are configured to provide;
   determining, for each respective region of the plurality of regions around the vehicle, a corresponding light sensitivity value of the sensor; and
   determining, for each respective region of the plurality of regions around the vehicle and based on (i) the corresponding light sensitivity value and (ii) the corresponding extent of illumination, a minimum reflectance of an object that the sensor is configured to detect.

10. The computer-implemented method of claim 1, wherein the plurality of regions around the vehicle are represented in a reference frame of the vehicle.

11. The computer-implemented method of claim 1, wherein the sensor is a camera, and wherein the parameter of the sensor comprises one or more of (i) an angular resolution of the camera, (ii) a dynamic range of the camera, or (iii) a frame rate of the camera.

12. The computer-implemented method of claim 1, wherein the sensor is a light detection and ranging (LIDAR) device, and wherein the parameter of the sensor comprises one or more of (i) a minimum range measurable by the LIDAR device, (ii) a maximum range measurable by the LIDAR device expressed as a function of reflectivity, (iii) a beam size of light generated by the LIDAR device, or (iv) a point density expressed as a function of object distance.

13. The computer-implemented method of claim 1, wherein the sensor is a radio detection and ranging (RADAR) device, and wherein the parameter of the sensor comprises one or more of (i) a minimum range measurable by the RADAR device, (ii) a maximum range measurable by the RADAR device expressed as a function of RADAR cross-section, (iii) a minimum relative speed measurable by the RADAR device, (iv) a maximum relative speed measurable by the RADAR device, (v) an angular accuracy of the RADAR device, or (vi) a minimum angular difference between two targets resolvable by the RADAR device.

14. The computer-implemented method of claim 1, further comprising:
   determining that the sensor is configured to provide sufficient sensor data for execution of the corresponding task based on the second subset of the plurality of regions comprising at least a threshold number of regions; and
   based on determining that the sensor is configured to provide sufficient sensor data for execution of the corresponding task, generating, by way of a user interface, a visual indication of the sensor being configured to provide sufficient sensor data for execution of the corresponding task.

15. The computer-implemented method of claim 1, further comprising:
   determining that the sensor is configured to provide insufficient sensor data for execution of the corresponding task based on the first subset of the plurality of regions comprising at least a threshold number of regions; and
   based on determining that the sensor is configured to provide insufficient sensor data for execution of the corresponding task, generating, by way of a user interface, a visual indication of the sensor being configured to provide insufficient sensor data for execution of the corresponding task.

16. The computer-implemented method of claim 1, wherein the target specification map associated with the corresponding task is based on road conditions comprising one or more of (i) a number of traversable lanes, (ii) a maximum slope of traversable lanes, or (iii) a minimum turn radius of the traversable lanes.

17. The computer-implemented method of claim 1, further comprising:
   receiving instructions indicating a modification to at least one of (i) the attained value of the parameter that the sensor is configured to provide for one or more regions of the plurality of regions, (ii) one or more road conditions on which the target specification map is based, (iii) one or more environmental conditions on which the target specification map is based, or (iv) a maneuverability of the vehicle when performing the corresponding task;
   updating one or more of the target specification map or the capability specification map based on the instructions indicating the modification;
   based on the updating, comparing the capability specification map to the target specification map to determine, for each respective region of the plurality of regions, an updated disparity between the target value and the attained value; and
   based on comparing the capability specification map to the target specification map, identifying one or more of: (i) an updated first subset of the plurality of regions where the target value exceeds the attained value or (ii) an updated second subset of the plurality of regions where the attained value meets or exceeds the target value.

18. A non-transitory computer-readable storage medium having stored thereon instructions that, when executed by a computing system, cause the computing system to perform operations comprising:
   determining a target specification map associated with a corresponding task, wherein the target specification map indicates, for each respective region of a plurality of regions around a vehicle equipped with a sensor, a target value of a parameter of the sensor;
   determining a capability specification map that indicates, for each respective region of the plurality of regions, an attained value of the parameter that the sensor is configured to provide;
   comparing the capability specification map to the target specification map to determine, for each respective region of the plurality of regions, a disparity between the target value and the attained value; and
   based on comparing the capability specification map to the target specification map, identifying one or more of: (i) a first subset of the plurality of regions where the target value exceeds the attained value or (ii) a second subset of the plurality of regions where the attained value meets or exceeds the target value.

19. The non-transitory computer-readable storage medium of claim 18, wherein determining the target specification map associated with the corresponding task comprises:
   obtaining a plurality of sensor data representing instances of an object to be detected in connection with performing the corresponding task;

determining, based on the plurality of sensor data and for each respective region of the plurality of regions, one or more attribute values associated with one or more of the instances of the object being represented in the respective region by the plurality of sensor data; and determining, for each respective region of the plurality of regions, the target value of the parameter of the sensor based on the one or more attribute values.

20. A system comprising:

a processor; and a non-transitory computer readable storage medium having stored thereon instructions that, when executed by the processor, cause the processor to perform operations comprising:

determining a target specification map associated with a corresponding task, wherein the target specification map indicates, for each respective region of a plurality of regions around a vehicle equipped with a sensor, a target value of a parameter of the sensor;

determining a capability specification map that indicates, for each respective region of the plurality of regions, an attained value of the parameter that the sensor is configured to provide;

comparing the capability specification map to the target specification map to determine, for each respective region of the plurality of regions, a disparity between the target value and the attained value; and based on comparing the capability specification map to the target specification map, identifying one or more of: (i) a first subset of the plurality of regions where the target value exceeds the attained value or (ii) a second subset of the plurality of regions where the attained value meets or exceeds the target value.

\* \* \* \* \*